(12) United States Patent
Fukuoka

(10) Patent No.: US 11,646,638 B2
(45) Date of Patent: May 9, 2023

(54) ELECTRIC WORK MACHINE

(71) Applicant: MAKITA CORPORATION, Anjo (JP)

(72) Inventor: Yoshimasa Fukuoka, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 17/519,167

(22) Filed: Nov. 4, 2021

(65) Prior Publication Data
US 2022/0190687 A1  Jun. 16, 2022

(30) Foreign Application Priority Data
Dec. 11, 2020  (JP) .............................. JP2020-205932

(51) Int. Cl.
*H02K 11/33* (2016.01)
*H02K 11/00* (2016.01)
*B25B 21/00* (2006.01)
*H02K 7/14* (2006.01)

(52) U.S. Cl.
CPC .......... *H02K 11/0094* (2013.01); *B25B 21/00* (2013.01); *H02K 7/145* (2013.01)

(58) Field of Classification Search
CPC ............ H02K 11/33; H02K 7/145; B25F 5/02
See application file for complete search history.

(56) References Cited

U.S. PATENT DOCUMENTS

2005/0121209 A1*  6/2005  Shimizu .................. B25B 21/00
                                                173/217
2017/0151657 A1   6/2017  Nagasaka et al.

FOREIGN PATENT DOCUMENTS

JP          2018-183875 A    11/2018

* cited by examiner

*Primary Examiner* — Dang D Le
(74) *Attorney, Agent, or Firm* — Oliff PLC

(57) ABSTRACT

An electric work machine includes a display that properly displays display-data. The electric work machine includes a motor including a stator and a rotor rotatable relative to the stator, an output unit driven by the rotor, a display panel that displays a setting state of the output unit, and a holder holding the display panel. The holder includes metal or synthetic resin.

20 Claims, 26 Drawing Sheets

FIG. 25

| SCREWING MACHINE STATE | EMITTED LIGHT COLOR |
| --- | --- |
| | LIGHT EMISSION STATE |
| SCREWING APPROPRIATE | GREEN |
| | ON FOR 2 SECONDS |
| SCREWING (TORQUE) INAPPROPRIATE | RED |
| | ON FOR 2 SECONDS |
| MAINTENANCE WARNING | YELLOW |
| | CONTINUE TO BLINK (SLOWLY) |

ELECTRIC WORK MACHINE

CROSS-REFERENCE TO RELATED APPLICATIONS

This application claims the benefit of priority to Japanese Patent Application No. 2020-205932, filed on Dec. 11, 2020, the entire contents of which are hereby incorporated by reference.

BACKGROUND

1. Technical Field

The present disclosure relates to an electric work machine.

2. Description of the Background

In the technical field of electric work machines, a known power tool includes a display and an operation unit, as described in, for example, Japanese Unexamined Patent Application Publication No. 2018-183875.

BRIEF SUMMARY

The display may fail to properly display display-data when, for example, the display or any of its associated components deteriorates.

One or more aspects of the present disclosure are directed to an electric work machine including a display that properly displays display-data.

A first aspect of the present disclosure provides an electric work machine, including:
a motor including a stator and a rotor, the rotor being rotatable relative to the stator;
an output unit driven by the rotor;
a display panel configured to display a setting state of the output unit; and
a holder holding the display panel, the holder comprising metal or synthetic resin.

A second aspect of the present disclosure provides an electric work machine, including:
a motor including a stator and a rotor, the rotor being rotatable relative to the stator;
an output unit driven by the rotor;
a display panel configured to display a setting state of the output unit;
a holder holding the display panel;
a cover having a display opening receiving a display screen included in the display panel, the cover fastening the holder;
a display cover covering the display opening and facing the display screen; and
a seal sealing a space between the display panel and the display cover.

A third aspect of the present disclosure provides an electric work machine, including:
a motor including a stator and a rotor, the rotor being rotatable relative to the stator;
an output unit driven by the rotor;
a display panel configured to display a setting state of the output unit; and
a holder holding the display panel, the holder including
a plate facing a rear surface of the display panel, the plate having a connection opening, and
a frame surrounding the plate.

A fourth aspect of the present disclosure provides an electric work machine, including:
a motor including a stator and a rotor, the rotor being rotatable relative to the stator;
an output unit driven by the rotor;
a display panel configured to display a setting state of the output unit;
a holder holding the display panel;
a first circuit board supporting the holder;
a second circuit board facing the first circuit board; and
a spacer between the first circuit board and the second circuit board.

A fifth aspect of the present disclosure provides an electric work machine, including:
a motor including a stator and a rotor, the rotor being rotatable relative to the stator;
an output unit driven by the rotor;
a display panel configured to display a setting state of the output unit;
a holder holding the display panel; and
a first circuit board supporting the holder, the first circuit board including a second positioner positioning the holder.

The electric work machine according to the above aspects of the present disclosure includes a display that properly displays display-data.

BRIEF DESCRIPTION OF DRAWINGS

FIG. 25 is a table showing the relationship between the state of the screwing machine and the light emission state of an indication light emitter.

DETAILED DESCRIPTION

Although one or more embodiments of the present disclosure will now be described with reference to the drawings, the present disclosure is not limited to the present embodiments. The components in the embodiments described below may be combined as appropriate. One or more components may be eliminated.

In the embodiments, the positional relationships between the components will be described using the directional terms such as right and left (or lateral), front and rear, and up and down (or vertical). The terms indicate relative positions or directions with respect to the center of a screwing machine 1.

The screwing machine 1 is an electric work machine powered by an electric motor. The screwing machine 1 is a power tool as an example of an electric work machine. A direction parallel to a rotation axis AX of the electric motor is referred to as an axial direction for convenience. A direction about the rotation axis AX is referred to as a circumferential direction or circumferentially, or a rotation direction for convenience. A direction radial from the rotation axis AX is referred to as a radial direction or radially for convenience.

The rotation axis AX extends in a front-rear direction. The axial direction corresponds to the front-rear direction. The axial direction is from the front to the rear or from the rear to the front. A position nearer the rotation axis AX in the radial direction, or a radial direction toward the rotation axis AX, is referred to as radially inward for convenience. A position farther from the rotation axis AX in the radial direction, or a radial direction away from the rotation axis AX, is referred to as radially outward for convenience.

The lateral direction (second direction), the front-rear direction (first direction), and the vertical direction (third direction) are orthogonal to one another.

Screwing Machine

Figure 1:
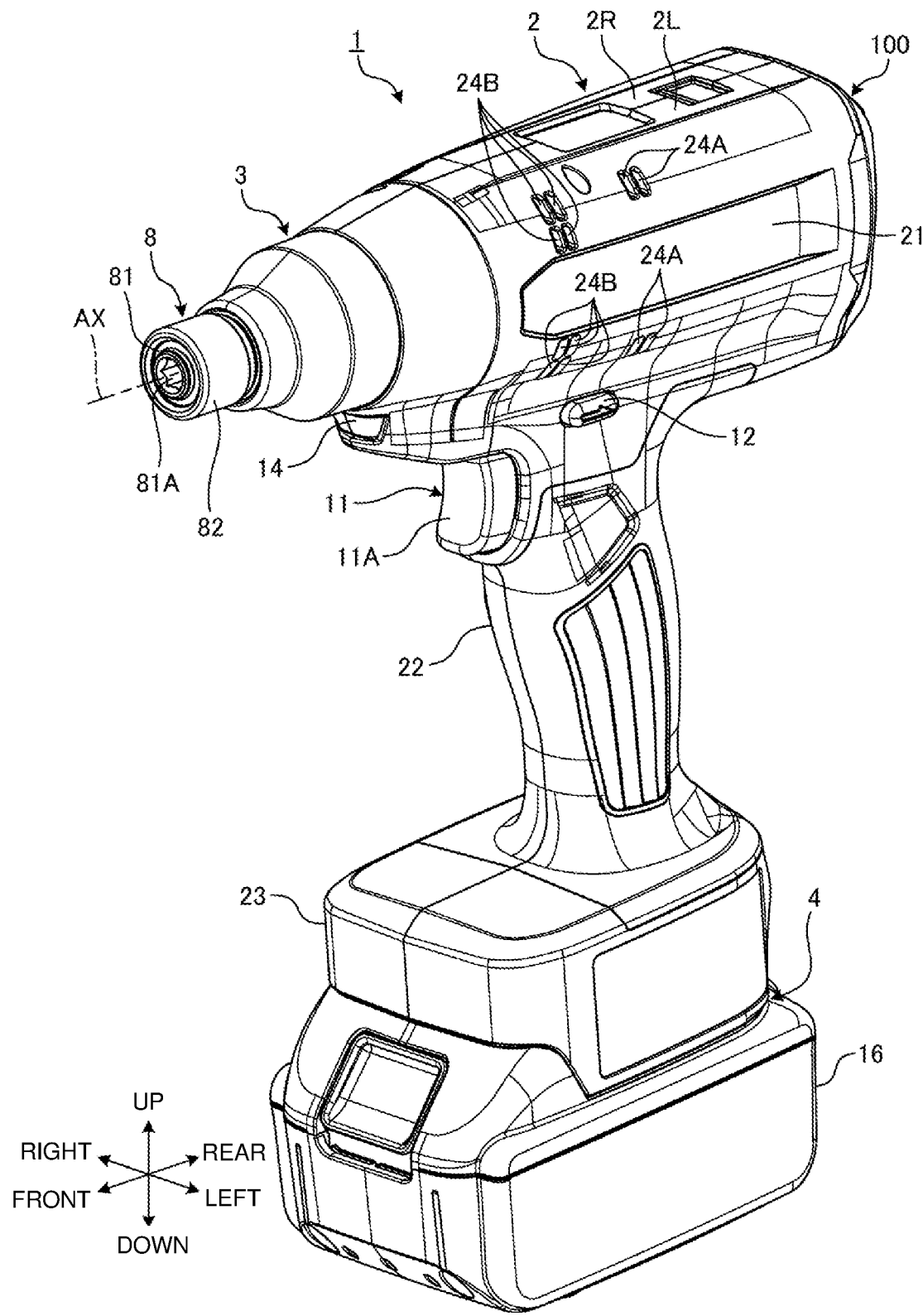
FIG. 1 is a perspective view of a screwing machine according to an embodiment as viewed from the left front.
Figure 2:
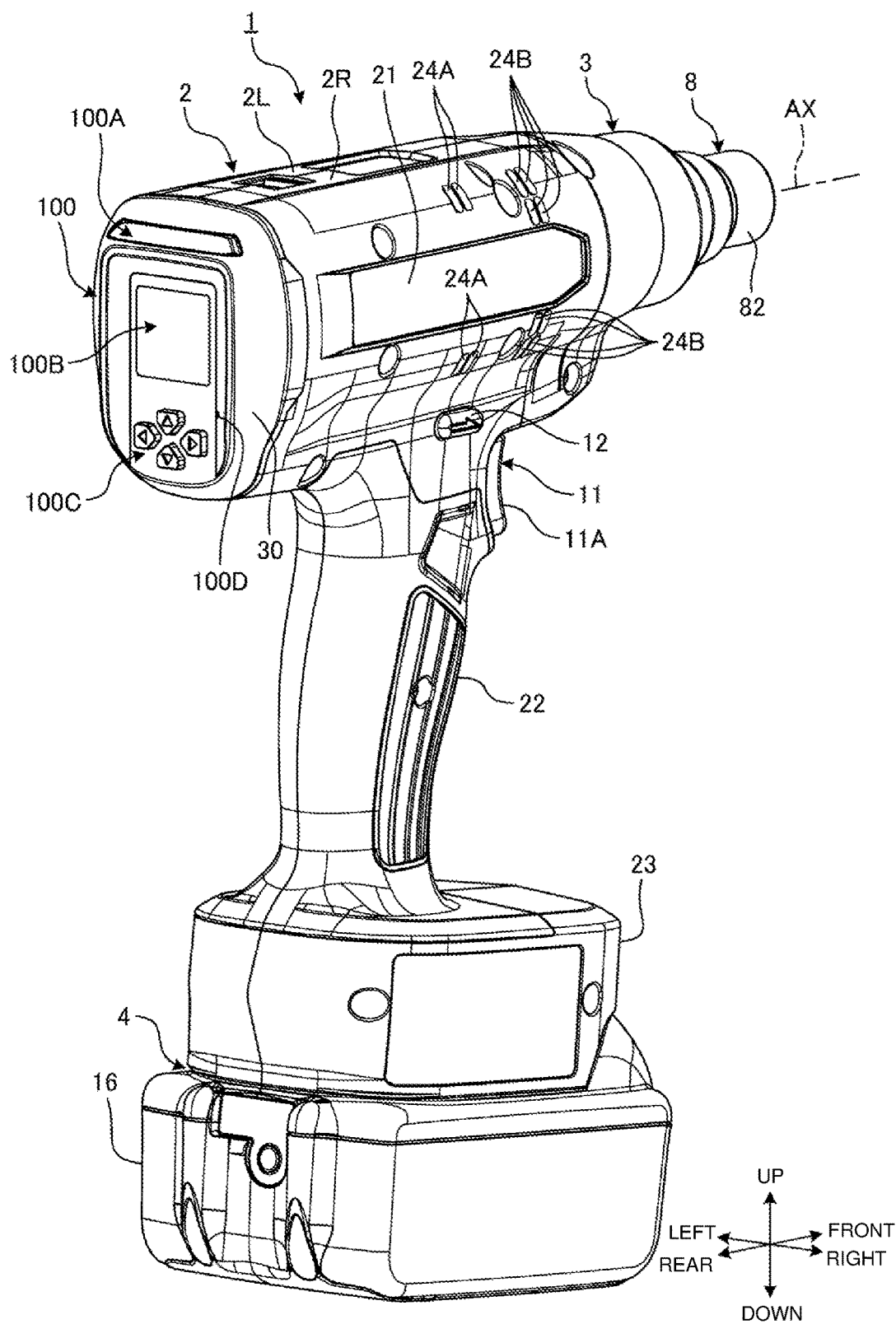
FIG. 2 is a perspective view of the screwing machine according to the embodiment as viewed from the right rear.
Figure 3:
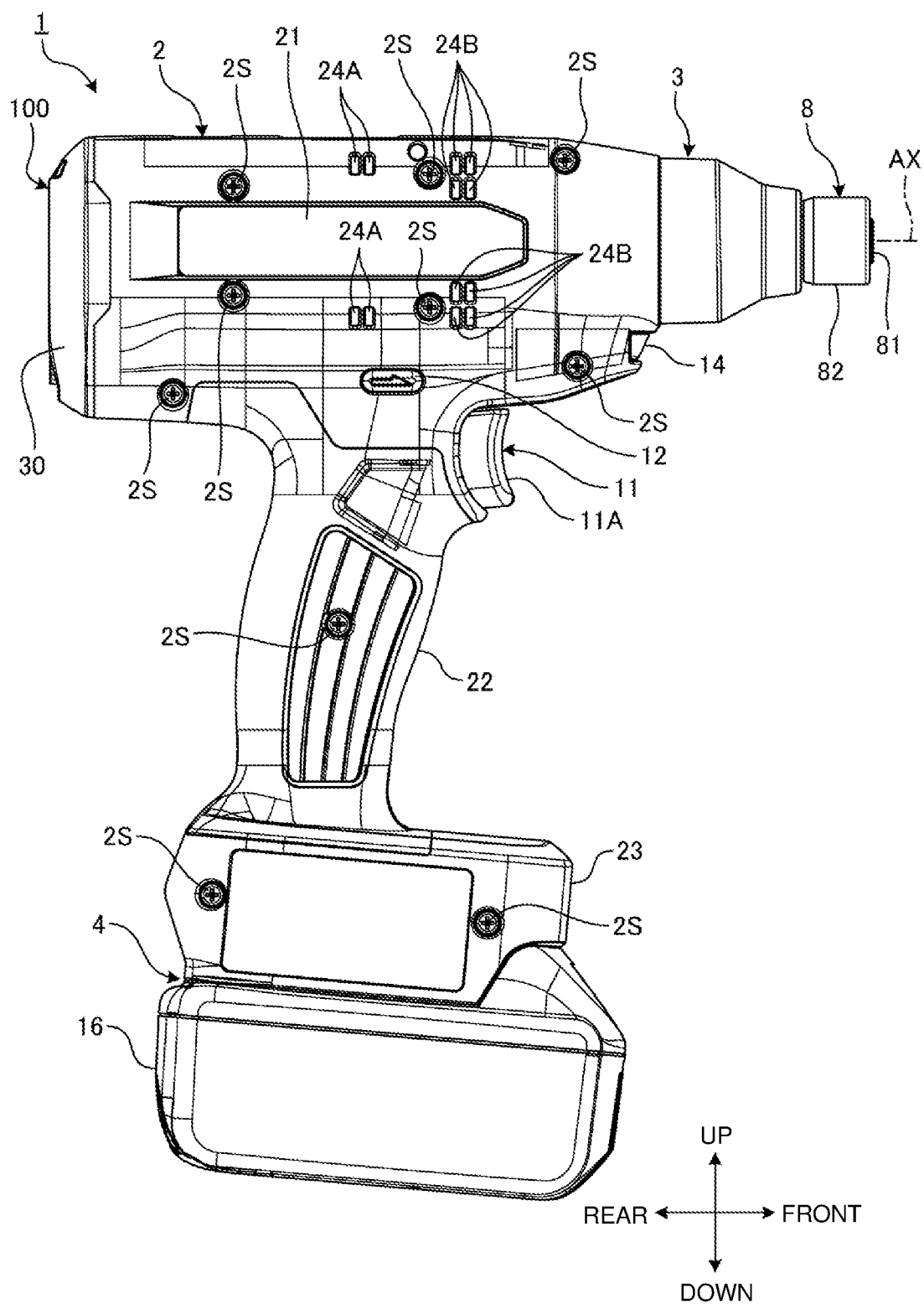
FIG. 3 is a side view of the screwing machine according to the embodiment.
Figure 4:
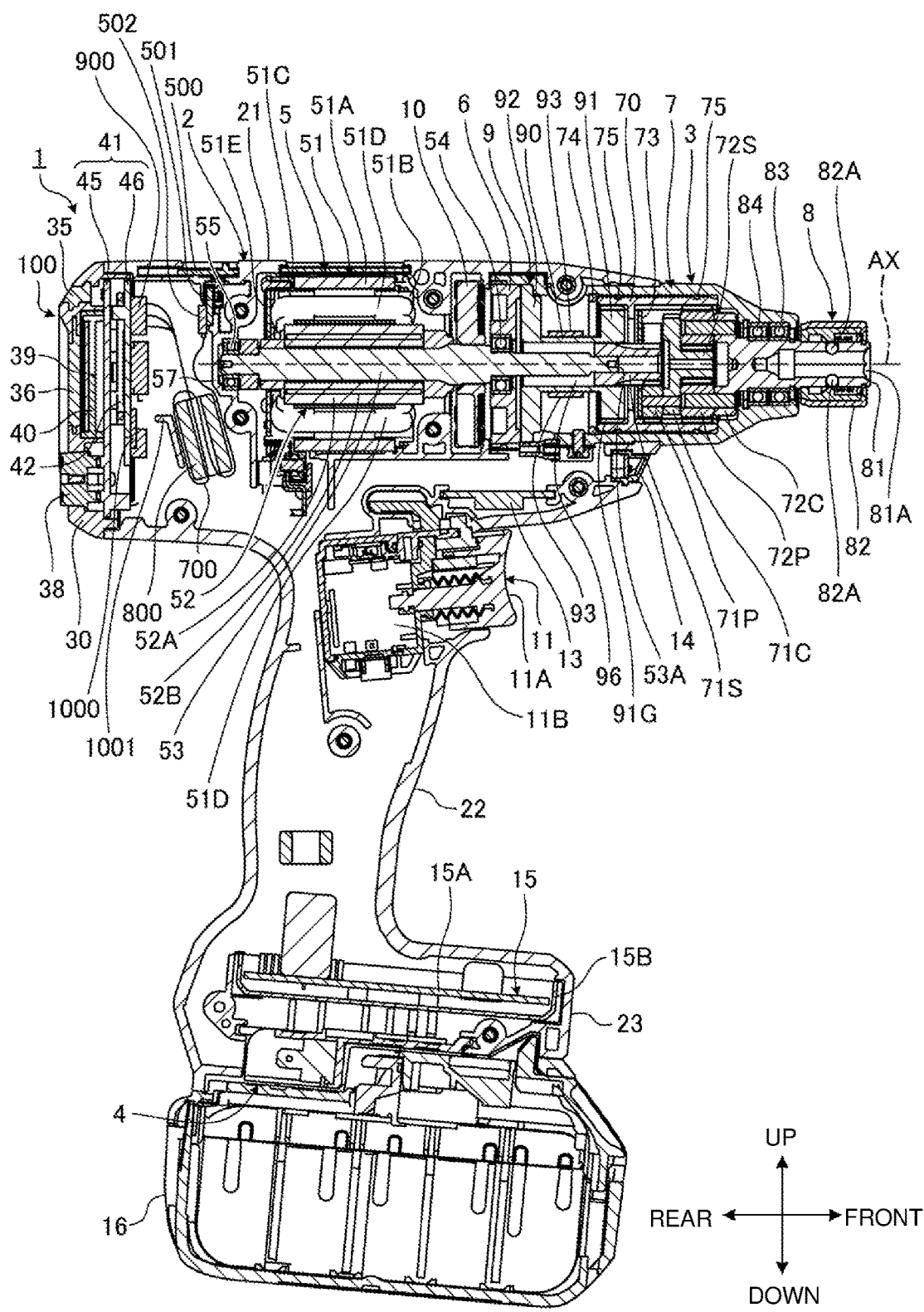
FIG. 4 is a cross-sectional view of the screwing machine according to the embodiment.

FIG. 1 is a perspective view of the screwing machine 1 according to an embodiment as viewed from the left front. FIG. 2 is a perspective view of the screwing machine 1 according to the embodiment as viewed from the right rear. FIG. 3 is a side view of the screwing machine 1 according to the embodiment. FIG. 4 is a cross-sectional view of the screwing machine 1 according to the embodiment.

The screwing machine 1 is an industrial electric screwdriver usable at a product assembly plant. In product assembly, a screwing operation is performed using the screwing machine 1. The assembly plant is, for example, a plant for automobile assembly. The product is, for example, an automobile.

As shown in FIGS. 1 to 4, the screwing machine 1 includes a housing 2, a gear case 3, a battery mount 4, a motor 5, a bearing box 6, a planetary gear assembly 7, an output unit 8, a torque sensor 9, a fan 10, a trigger switch 11, a forward-reverse switch lever 12, a sound generator 13, a light emitter 14, a main controller 15, and a rear cover unit 100.

The housing 2 is formed from synthetic resin. The housing 2 includes a left housing 2L and a right housing 2R. The left housing 2L and the right housing 2R are fastened together with screws 2S, thus forming the housing 2.

The housing 2 includes a motor compartment 21, a grip 22, and a controller compartment 23.

The motor compartment 21 accommodates the motor 5. The motor compartment 21 includes a cylindrical portion extending in the front-rear direction. The motor compartment 21 is located above the grip 22.

The grip 22 is gripped by an operator with a hand. The grip 22 is located below the motor compartment 21. The grip 22 extends downward from the motor compartment 21. The trigger switch 11 is located on the grip 22.

The controller compartment 23 accommodates the main controller 15. The controller compartment 23 is located below the grip 22. The controller compartment 23 is connected to a lower end of the grip 22. The controller compartment 23 has larger outer dimensions than the grip 22 in the front-rear and lateral directions.

The gear case 3 accommodates the bearing box 6, the torque sensor 9, the planetary gear assembly 7, and a part of the output unit 8. The gear case 3 is located frontward from at least a part of the motor 5. The gear case 3 is cylindrical. The gear case 3 is formed from metal. The gear case 3 in the embodiment is formed from aluminum. The gear case 3 covers a front opening of the motor compartment 21. The gear case 3 is fastened to the motor compartment 21. The gear case 3 has a rear portion in the motor compartment 21. The motor compartment 21 at least partially surrounds the gear case 3. The gear case 3 has a front portion located frontward from the motor compartment 21.

The battery mount 4 is located below the controller compartment 23. The battery mount 4 is connected to a battery pack 16. The battery pack 16 is attached to the battery mount 4 in a detachable manner. The battery pack 16 may be a secondary battery. The battery pack 16 in the embodiment is a rechargeable lithium-ion battery. The battery pack 16 is attached to the battery mount 4 to power the screwing machine 1. The motor 5 is drivable by power supplied from the battery pack 16. The main controller 15 and the rear cover unit 100 each operate on power supplied from the battery pack 16.

The motor 5 is a power source for the screwing machine 1. The motor 5 is an electric motor. The motor 5 is a brushless inner-rotor motor. The motor 5 is accommodated in the motor compartment 21.

The motor 5 includes a stator 51 and a rotor 52. The stator 51 surrounds the rotor 52. The rotor 52 rotates relative to the stator 51. The rotor 52 rotates about the rotation axis AX. The gear case 3 is located frontward from the stator 51.

The stator 51 includes a stator core 51A, a front insulator 51B, a rear insulator 51C, coils 51D, and a sensor board 51E.

The stator core 51A is cylindrical. The stator core 51A includes multiple steel plates stacked on one another. The front insulator 51B is fastened to the front of the stator core 51A. The rear insulator 51C is fastened to the rear of the stator core 51A. The stator 51 includes multiple coils 51D. The coils 51D are wound around the teeth on the stator core 51A with the front insulator 51B and the rear insulator 51C between them. The sensor board 51E includes multiple detectors to detect rotation of the rotor 52. The sensor board 51E is supported by the rear insulator 51C. Fuse terminals are connected to the coils 51D.

The rotor 52 includes a rotor core 52A, permanent magnets 52B, and a rotor shaft 53.

The rotor core 52A is located inside the stator core 51A and the coils 51D. The rotor core 52A is cylindrical. The rotor core 52A surrounds the rotor shaft 53. The rotor core 52A is fastened to the rotor shaft 53. The rotor core 52A includes multiple steel plates stacked on one another. The rotor 52 includes multiple permanent magnets 52B. The permanent magnets 52B are held by the rotor core 52A. The rotor core 52A has through-holes extending in the front-rear direction. The rotor core 52A has multiple through-holes aligned circumferentially. The permanent magnets 52B are placed in the respective through-holes in the rotor core 52A.

The detectors in the sensor board 51E detect the magnetic fields of the permanent magnets 52B to detect rotation of the rotor 52. The main controller 15 provides a drive current to the coils 51D in response to the detection signals from the detectors.

The rotor shaft 53 extends in the front-rear direction. The rotor shaft 53 rotates about the rotation axis AX. The rotation axis AX of the rotor shaft 53 is aligned with the rotation axis of the output unit 8.

The rotor 52 is at least partially supported by a bearing 54. The rotor 52 is at least partially supported by a bearing 55.

The bearing 54 is located between the front end of the stator 51 and the rear end of the torque sensor 9 in the front-rear direction. The bearing 54 rotatably supports the front of the rotor shaft 53. The bearing 54 supports a part of the rotor shaft 53 located frontward from the stator 51.

The bearing 55 is located rearward from the rear end of the stator 51 in the front-rear direction. The bearing 55 rotatably supports the rear of the rotor shaft 53. The bearing 55 supports a part of the rotor shaft 53 located rearward from the stator 51.

The bearing box 6 surrounds and supports the bearing 54. The bearing box 6 is accommodated in and fastened to the gear case 3.

The bearing 55 is held in a bearing holder 57 in the motor compartment 21.

The rotor shaft 53 has its front end 53A located frontward from the bearing 54 and inside the gear case 3.

The front end 53A of the rotor shaft 53 receives a pinion gear 71S. The rotor shaft 53 is connected to the planetary gear assembly 7 via the pinion gear 71S.

The planetary gear assembly 7 is accommodated in the gear case 3. The planetary gear assembly 7 is located frontward from the torque sensor 9. The planetary gear assembly 7 connects the rotor shaft 53 and the output unit 8 together. The planetary gear assembly 7 reduces rotation of the rotor shaft 53 and rotates the output unit 8 at a lower rotational speed than the rotor shaft 53. The planetary gear assembly 7 functions as a power transmission assembly that transmits rotational power generated by the motor 5 to the output unit 8.

The planetary gear assembly 7 includes planetary gears 71P, a carrier 71C, a sun gear 72S, planetary gears 72P, a carrier 72C, and an internal gear 70. The planetary gears 71P, the carrier 71C, the sun gear 72S, the planetary gears 72P, the carrier 72C, and the internal gear 70 are accommodated in the gear case 3.

The planetary gear assembly 7 includes multiple planetary gears 71P. The multiple (three in the embodiment) planetary gears 71P surround the pinion gear 71S. Each planetary gear 71P meshes with the pinion gear 71S and the internal gear 70.

The carrier 71C rotatably supports the planetary gears 71P.

The sun gear 72S is in front of the carrier 71C. The sun gear 72S has a smaller diameter than the carrier 71C. The sun gear 72S is integral with the carrier 71C. The sun gear 72S and the carrier 71C rotate together.

The planetary gear assembly 7 includes multiple planetary gears 72P. The multiple (four in the embodiment) planetary gears 72P surround the sun gear 72S. Each planetary gear 72P meshes with the sun gear 72S. The planetary gears 72P are located between the sun gear 72S and the internal gear 70 in the radial direction.

The carrier 72C rotatably supports the planetary gears 72P. The carrier 72C is connected to the output unit 8. The carrier 72C is rotatable about the rotation axis AX.

The internal gear 70 is substantially cylindrical. The internal gear 70 surrounds and meshes with the planetary gears 72P. The gear case 3 has an inner circumferential surface that faces the outer circumferential surface of the internal gear 70. The internal gear 70 in the embodiment is rotatable relative to the gear case 3. The internal gear 70 is connected to the torque sensor 9.

A washer 73 is located behind the planetary gears 71P inside the internal gear 70. The washer 73 surrounds the pinion gear 71S.

An elastic member 74 is located inside the gear case 3. The elastic member 74 is annular. The elastic member 74 is, for example, a rubber O-ring. The elastic member 74 is received in a groove on the inner circumferential surface of the gear case 3. The internal gear 70 has its rear end face in contact with the elastic member 74.

Elastic members 75 are located between the gear case 3 and the internal gear 70 in the radial direction. The elastic members 75 are annular. The elastic members 75 are, for example, rubber O-rings. The elastic members 75 are received in grooves on the outer circumferential surface of the internal gear 70. The gear case 3 has its inner circumferential surface in contact with the elastic members 75. In the embodiment, two elastic members 75 are arranged in the front-rear direction.

The pinion gear 71S is connected to the planetary gears 72P via the planetary gears 71P, the carrier 71C, and the sun gear 72S. The planetary gears 72P and the carrier 72C are rotated by the rotor 52. The planetary gears 71P are connected to the internal gear 70 via the carrier 71C, the sun gear 72S, and the planetary gears 72P.

When the rotor shaft 53 rotates as driven by the motor 5, the pinion gear 71S rotates, and the planetary gears 71P revolve about the pinion gear 71S. The carrier 71C and the sun gear 72S then rotate at a lower rotational speed than the rotor shaft 53. As the sun gear 72S rotates, the planetary gears 72P revolve about the sun gear 72S. The carrier 72C then rotates at a lower rotational speed than the carrier 71C. In this manner, as the motor 5 is driven, the carrier 72C rotates at a lower rotational speed than the rotor shaft 53.

The output unit 8 is drivable by the rotor 52. The output unit 8 rotates by rotational power transmitted from the rotor 52 through the planetary gear assembly 7. The output unit 8 rotates about the rotation axis AX. The output unit 8 is located frontward from the stator 51. The output unit 8 is at least partially located frontward from the planetary gear assembly 7. The output unit 8 receives a bit (tip tool) attached to it. The output unit 8 rotates with the bit attached to it.

The output unit 8 includes a spindle 81 and a chuck 82.

The spindle 81 rotates about the rotation axis AX by rotational power transmitted from the rotor 52. The spindle 81 is rotatably supported by a bearing 83 and a bearing 84. The spindle 81 is connected to the carrier 72C. As the carrier 72C rotates, the spindle 81 rotates about the rotation axis AX.

The spindle 81 has an insertion hole 81A for receiving the bit. The insertion hole 81A extends rearward from the front end of the spindle 81. The insertion hole 81A has a hexagonal cross section in a direction orthogonal to the rotation axis AX. The bit also has a hexagonal cross section. The bit is received in the insertion hole 81A, and thus fitted to the spindle 81 immovable in the circumferential direction.

The chuck 82 surrounds a front portion of the spindle 81. The chuck 82 restricts the bit from slipping off the insertion hole 81A. The bit has recesses on its side surface. The chuck 82 includes balls 82A received in the recesses on the bit. The balls 82A on the chuck 82 are received in the recesses on the bit with the bit placed through the insertion hole 81A. This restricts the bit from slipping off the insertion hole 81A. The bit received in the insertion hole 81A rotates as the spindle 81 rotates.

The torque sensor 9 is a detector for detecting any abnormality in an operation performed by the output unit 8. The torque sensor 9 is connected to the output unit 8. The operation performed by the output unit 8 in the embodiment includes a screwing operation. The torque sensor 9 in the embodiment detects the torque applied to the output unit 8 in a screwing operation. The torque sensor 9 outputs a detection signal indicating the torque applied to the output unit 8. The screwing operation is performed by the output unit 8 with the bit attached to it. The torque detected by the torque sensor 9 includes torque for tightening the screw applied to the output unit 8 during the screwing operation.

The torque sensor 9 is accommodated in the gear case 3. The torque sensor 9 is located between the stator 51 and the output unit 8 in the front-rear direction. The torque sensor 9 in the embodiment is located between the fan 10 and the planetary gear assembly 7.

The torque sensor 9 is cylindrical. The torque sensor 9 surrounds the rotor shaft 53. The rotor shaft 53 has its front end 53A located frontward from the front end of the torque sensor 9. The pinion gear 71S has its front end located frontward from the front end of the torque sensor 9. The fan 10 and the motor 5 are located rearward from the rear end of the torque sensor 9.

The torque sensor 9 includes a hollow portion 90, a front plate 91, a rear plate 92, and strain gauges 93.

The hollow portion 90 is cylindrical. The hollow portion 90 is located between the front plate 91 and the rear plate 92 in the front-rear direction. The hollow portion 90 has the center axis aligned with the rotation axis AX. The hollow portion 90 surrounds the rotor shaft 53.

The front plate 91 is fixed to the front end of the hollow portion 90. The front plate 91 is integral with the hollow portion 90. The front plate 91 is substantially annular. The front plate 91 has the center axis aligned with the rotation axis AX. The front plate 91 surrounds the rotor shaft 53. The pinion gear 71S mounted on the rotor shaft 53 is at least partially located frontward from the front end of the front plate 91. The front plate 91 has a larger outer diameter than the hollow portion 90. Gear teeth 91G are located on the outer circumferential surface of the front plate 91.

The front plate 91 is coupled to the internal gear 70. The internal gear 70 at least partially surrounds the front plate 91. The gear teeth 91G on the front plate 91 mesh with the teeth on the internal gear 70, engaging the front plate 91 with the internal gear 70. The front plate 91 and the internal gear 70 are fixed to each other in the rotation direction. The torque sensor 9 is connected to the internal gear 70 with the front plate 91. The carrier 72C is connected to the output unit 8. The torque sensor 9 is connected to the output unit 8 with the planetary gear assembly 7 in between.

The rear plate 92 is located rearward from the front plate 91. The rear plate 92 is fixed to the rear end of the hollow portion 90. The rear plate 92 is integral with the hollow portion 90. The rear plate 92 is substantially annular. The rear plate 92 has the center axis aligned with the rotation axis AX. The rear plate 92 surrounds the rotor shaft 53. The rear plate 92 has a larger outer diameter than the hollow portion 90 and the front plate 91.

The rear plate 92 is supported by the gear case 3. The gear case 3 at least partially surrounds the rear plate 92. The rear plate 92 is fastened to at least a part of the gear case 3. The gear case 3 is fastened to the housing 2. The rear plate 92 is fastened to the housing 2 with the gear case 3 in between.

The torque sensor 9 has a through-hole 96 extending through the front surface of the front plate 91 and the rear surface of the rear plate 92. The through-hole 96 at least partially extends through the hollow portion 90. The rotor shaft 53 is at least partially placed in the through-hole 96.

The strain gauges 93 are fixed on the hollow portion 90. The strain gauges 93 output detection signals (voltages) indicating torque applied to the output unit 8. The strain gauges 93 in the embodiment are fixed to the outer surface of the hollow portion 90. The multiple (four in the embodiment) strain gauges 93 are fixed on the hollow portion 90. The four strain gauges 93 are arranged at circumferentially equal intervals on the hollow portion 90.

Torque applied to the output unit 8 in a screwing operation is transmitted to the internal gear 70 through the carrier 72C and the planetary gears 72P. The front plate 91 in the torque sensor 9 is connected to the internal gear 70. The rear plate 92 in the torque sensor 9 is fastened to at least a part of the gear case 3. Thus, in response to the internal gear 70 receiving torque, the hollow portion 90 is twisted in the rotation direction. This deforms the four strain gauges 93 on the surface of the hollow portion 90. The strain gauges 93 then output detection signals indicating the torque applied to the hollow portion 90. In this manner, the torque applied to the output unit 8 is transmitted to the torque sensor 9 through the planetary gear assembly 7, enabling the torque sensor 9 to detect the torque applied to the output unit 8.

The strain gauges 93 in the embodiment indirectly detect the torque applied to the output unit 8 by detecting the torque applied to the hollow portion 90. As the torque applied to the output unit 8 increases, the detection signals output from the strain gauges 93 become higher. As the torque applied to the output unit 8 decreases, the detection signals (voltages) output from the strain gauges 93 become lower.

The fan 10 generates an airflow for cooling the motor 5. The fan 10 is located between the stator 51 and the bearing box 6 in the front-rear direction. The fan 10 is fixed to the rotor shaft 53. The fan 10 rotates as the rotor shaft 53 rotates.

The motor compartment 21 has inlets 24A and outlets 24B. The inlets 24A connect the inside and the outside of the motor compartment 21. The outlets 24B connect the inside and the outside of the motor compartment 21. The inlets 24A are located rearward from the outlets 24B. As the fan 10 rotates, air outside the housing 2 flows into the internal space of the housing 2 through the inlets 24A. Air flowing into the internal space of the housing 2 flows through the housing 2 and cools the motor 5. The air passing through the housing 2 flows out of the housing 2 through the outlets 24B.

The trigger switch 11 activates the motor 5. The trigger switch 11 is located on the grip 22. The trigger switch 11 includes a trigger 11A and a switch body 11B. The switch body 11B is accommodated in the grip 22. The trigger 11A protrudes frontward from the upper front of the grip 22. The trigger 11A is operable by the operator. The trigger 11A is operated to switch the motor 5 between the driving state and the stopped state.

The forward-reverse switch lever 12 is operable to change the rotation direction of the rotor 52. The forward-reverse switch lever 12 is located above the grip 22. The forward-reverse switch lever 12 is operable by the operator to switch the rotation direction of the rotor 52 between forward and reverse. This switches the rotation direction of the output unit 8.

The sound generator 13 generates a sound in response to a detection signal from the torque sensor 9. The sound generator 13 includes a buzzer element or a vibration element. The sound generator 13 is accommodated in the motor compartment 21. The sound generator 13 in the embodiment is at least partially located below the gear case 3.

The light emitter 14 illuminates the output unit 8 or ahead of the output unit 8. The light emitter 14 is located in a front portion of the motor compartment 21. The light emitter 14 emits illumination light frontward. The light emitter 14 includes, for example, a light-emitting diode (LED).

The main controller 15 includes a computer system. The main controller 15 outputs control signals for controlling the motor 5. The main controller 15 is accommodated in the controller compartment 23. The main controller 15 includes a board 15A incorporating multiple electronic components. The main controller 15 is at least partially accommodated in a controller case 15B. Examples of the electronic components mounted on the board 15A include a processor such as a central processing unit (CPU), a nonvolatile memory such as a read-only memory (ROM) or a storage device, a volatile memory such as a random-access memory (RAM), a transistor, a capacitor, and a resistor.

Rear Cover Unit

Figure 5:
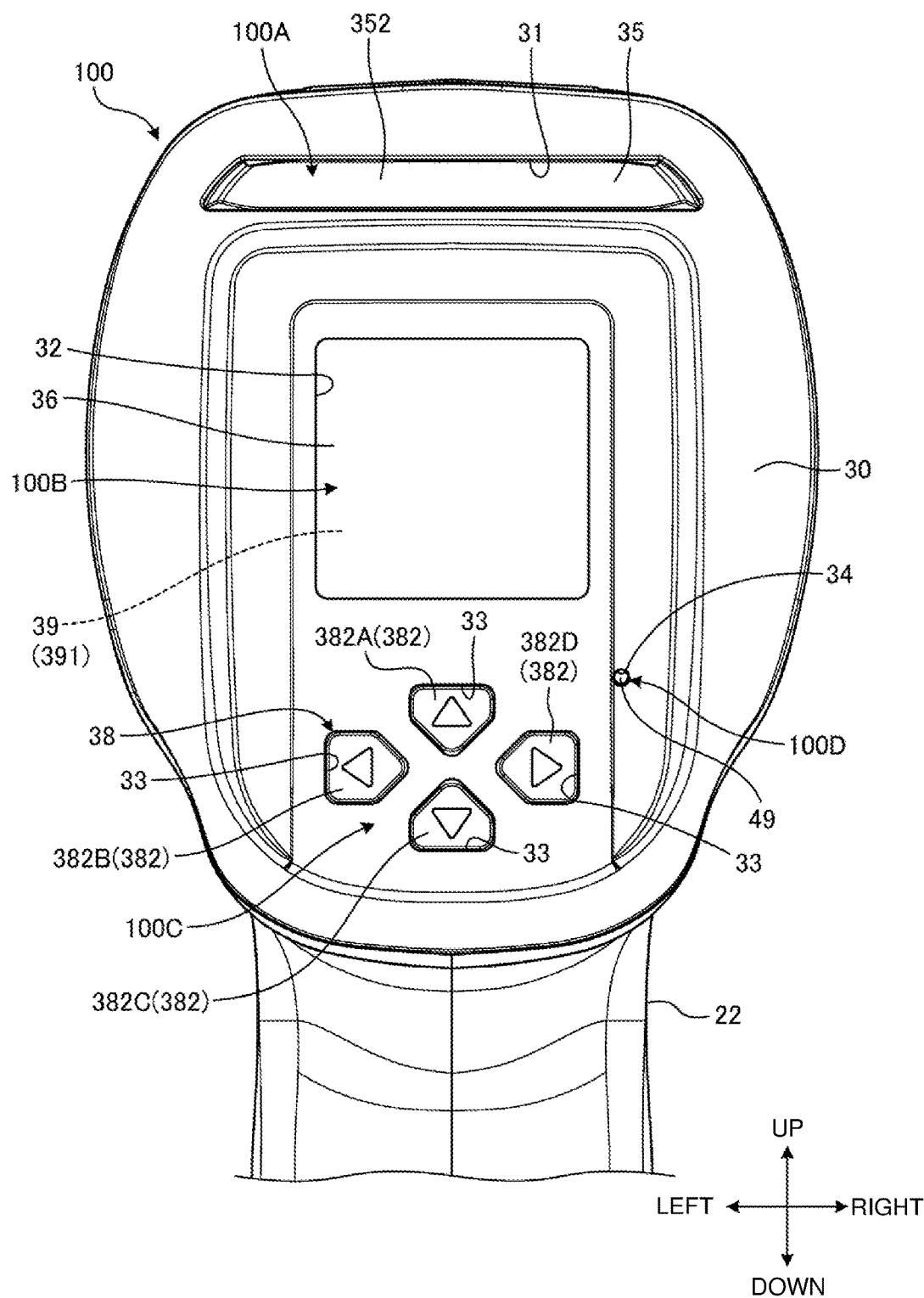
FIG. 5 is a rear view of a rear cover unit in the embodiment.
Figure 6:
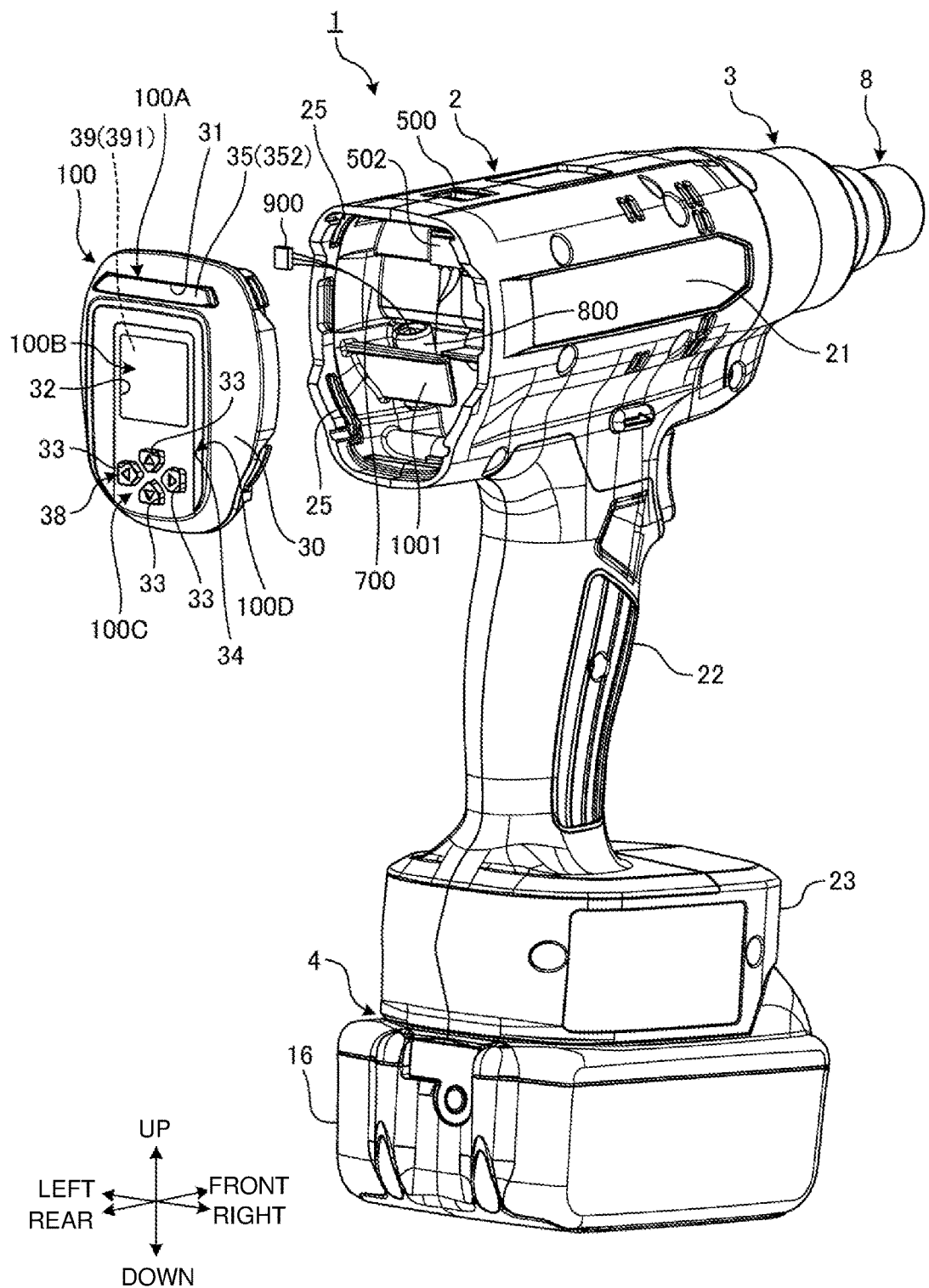
FIG. 6 is an exploded perspective view of the screwing machine according to the embodiment as viewed from the right rear.

FIG. 5 is a rear view of the rear cover unit 100 in the embodiment. FIG. 6 an exploded perspective view of the screwing machine 1 according to the embodiment as viewed from the right rear.

The rear cover unit 100 can function as a user interface to allow data communication and other operations between an operator and the screwing machine 1. The rear cover unit 100 includes a cover 30, an indication light emitter 100A, a display 100B, an operation unit 100C, and a communication light emitter 100D. The rear cover unit 100 covers a rear opening in the motor compartment 21.

The cover 30 is held between the left housing 2L and the right housing 2R to be fastened to the motor compartment 21. The cover 30 covers the rear opening in the motor compartment 21. The cover 30 is formed from synthetic resin such as a nylon resin.

The cover 30 has an indication opening 31, a display opening 32, operation openings 33, and a communication opening 34. The indication opening 31 is located in an upper portion of the cover 30. The indication opening 31 is elongated in the lateral direction. The display opening 32 is at the center of the cover 30. The display opening 32 is quadrangular. The operation openings 33 are located in a lower portion of the cover 30. The cover 30 has four operation openings 33. The operation openings 33 are pentagonal. The communication opening 34 is located rightward from the display opening 32 and the operation openings 33. The communication opening 34 is circular.

The indication light emitter 100A uses light to at least indicate the status of an operation performed by the output unit 8. The indication light emitter 100A changes its light emission state to indicate, for the operator, the status of an operation performed by the output unit 8. The indication light emitter 100A is at least partially received in the indication opening 31. The function of the indication light emitter 100A is not limited to indicating the status of an operation performed by the output unit 8.

The display 100B displays at least the setting status of the output unit 8. The display 100B uses display-data to indicate, for the operator, the setting status of the output unit 8. The display 100B changes display-data appearing on the display 100B to indicate the setting status of the output unit 8. The display 100B is at least partially received in the display opening 32. The function of the display 100B is not limited to indicating the setting status of the output unit 8.

The operation unit 100C is operable by the operator to control at least the display 100B. The operation unit 100C causes the display 100B to, for example, display display-data and change display-data appearing on the display 100B. The operation unit 100C in the embodiment is at least partially received in the operation openings 33. The function of the operation unit 100C is not limited to the operation of controlling the display 100B.

The communication light emitter 100D uses light to indicate the communication status of the rear cover unit 100. As shown in FIG. 4, the rear cover unit 100 in the embodiment includes a wireless communication device 1000. The wireless communication device 1000 can perform near-field communication with any license-free communications scheme. The wireless communication device 1000 can perform wireless communication with, for example, any communications scheme in accordance with IEEE 802.15.1 standard standardized by the Institute of Electrical and Electronics Engineers (IEEE). The communication light emitter 100D emits light to indicate that the wireless communication device 1000 is activated. The communication light emitter 100D is at least partially received in the communication opening 34. The communications scheme for the wireless communication device 1000 is, for example, Wi-Fi (registered trademark).

Figure 7:
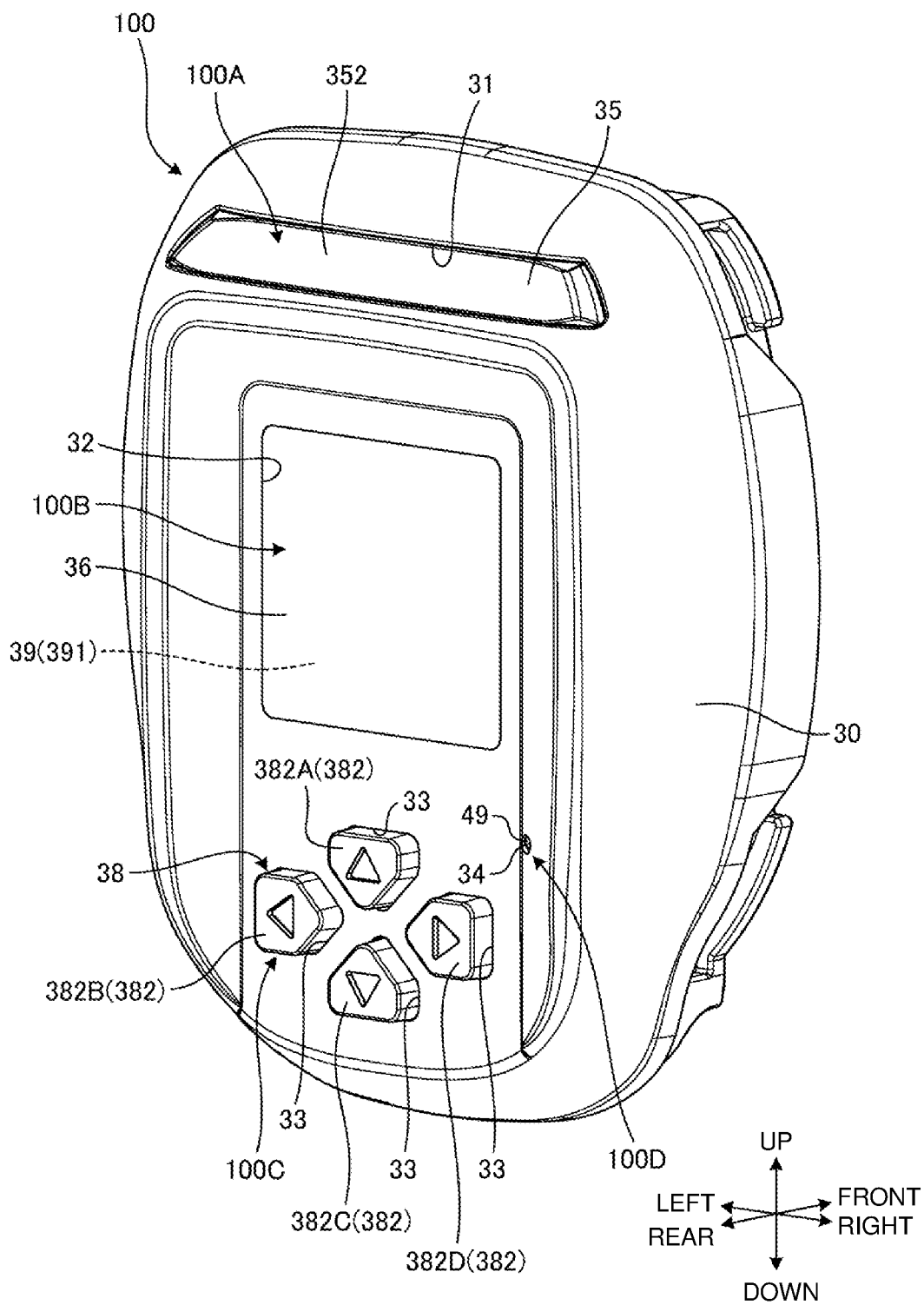
FIG. 7 is a perspective view of the rear cover unit in the embodiment as viewed from the right rear.
Figure 8:
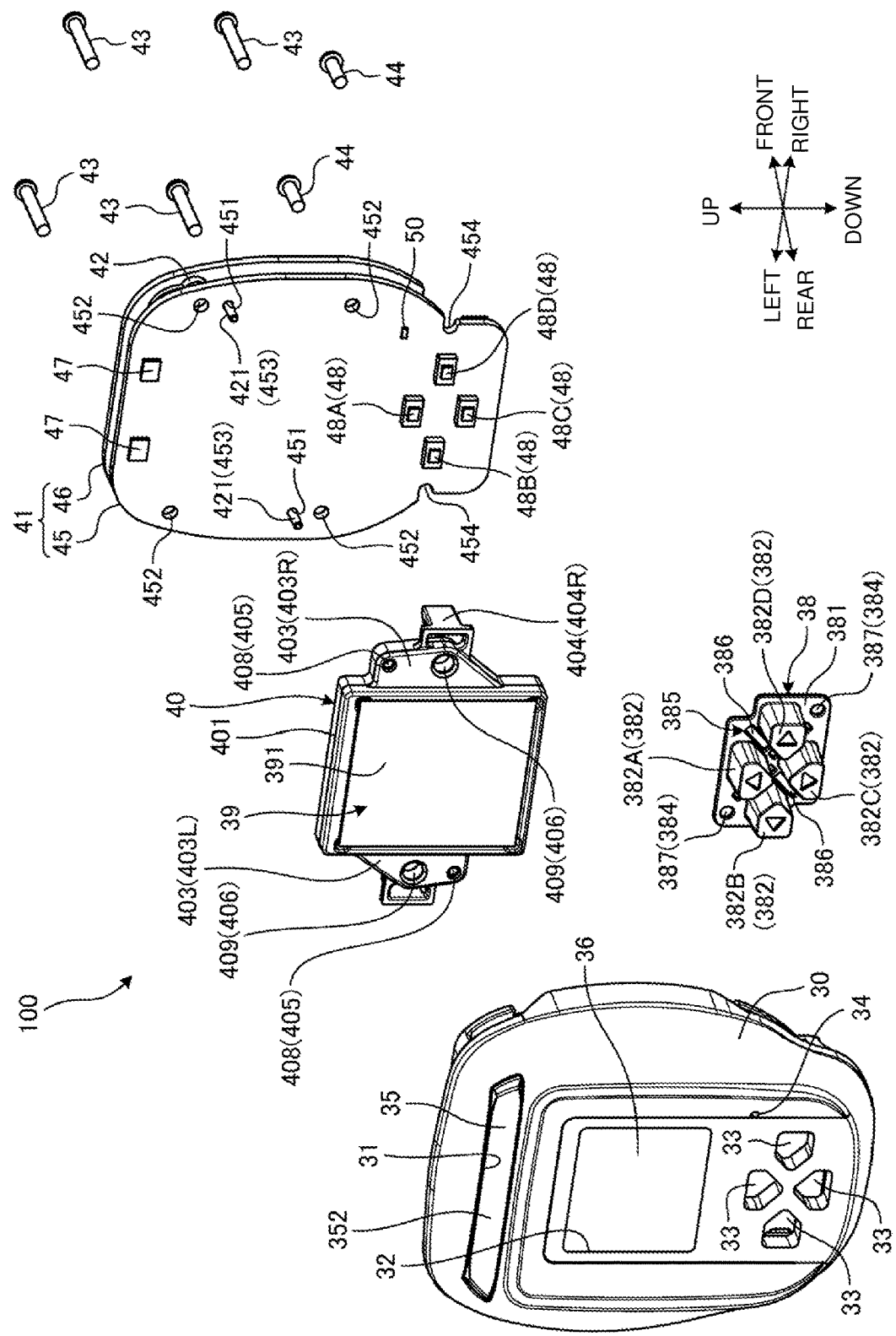
FIG. 8 is an exploded perspective view of the rear cover unit in the embodiment as viewed from the right rear.
Figure 9:
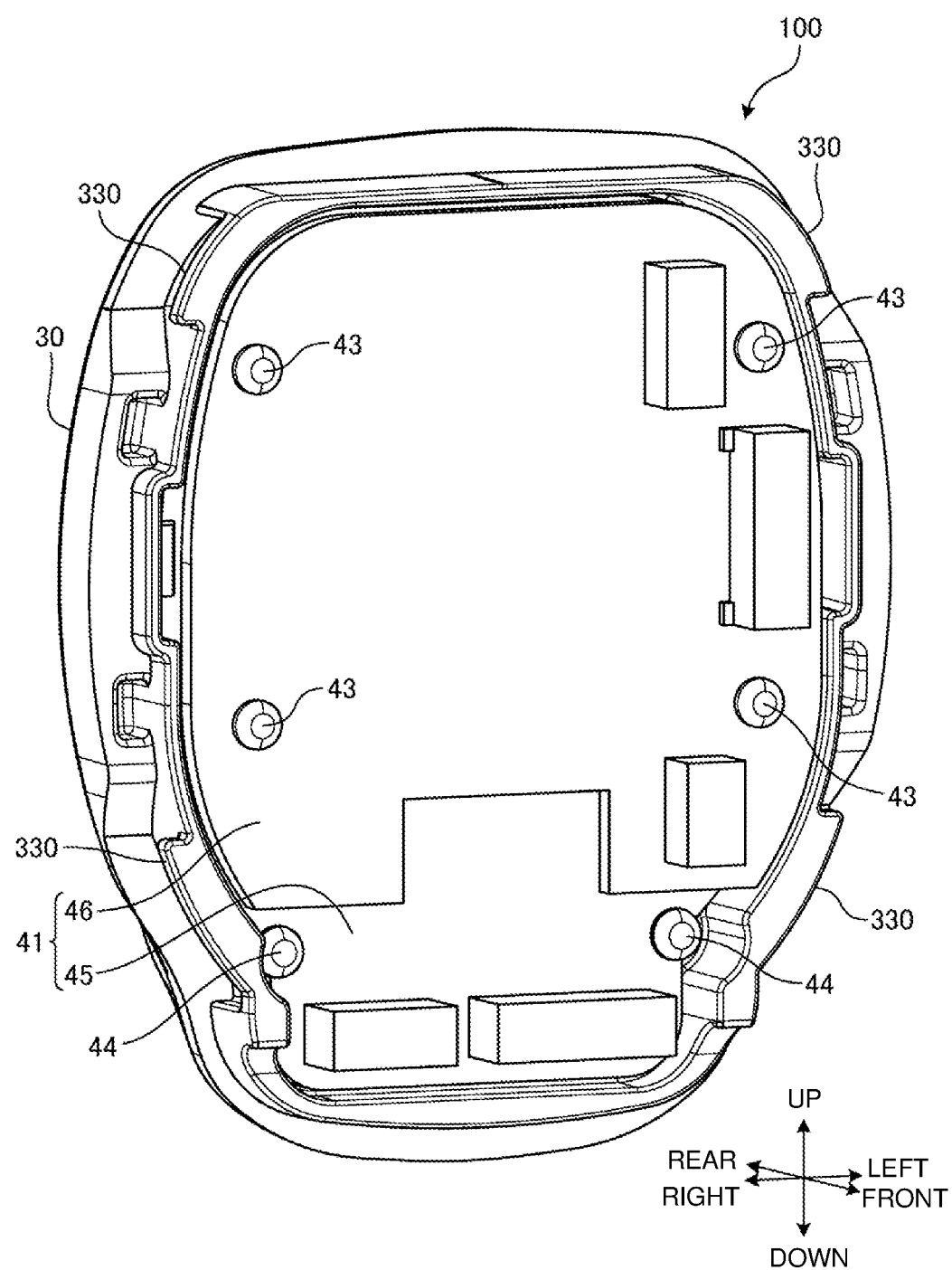
FIG. 9 is a perspective view of the rear cover unit in the embodiment as viewed from the right front.
Figure 10:
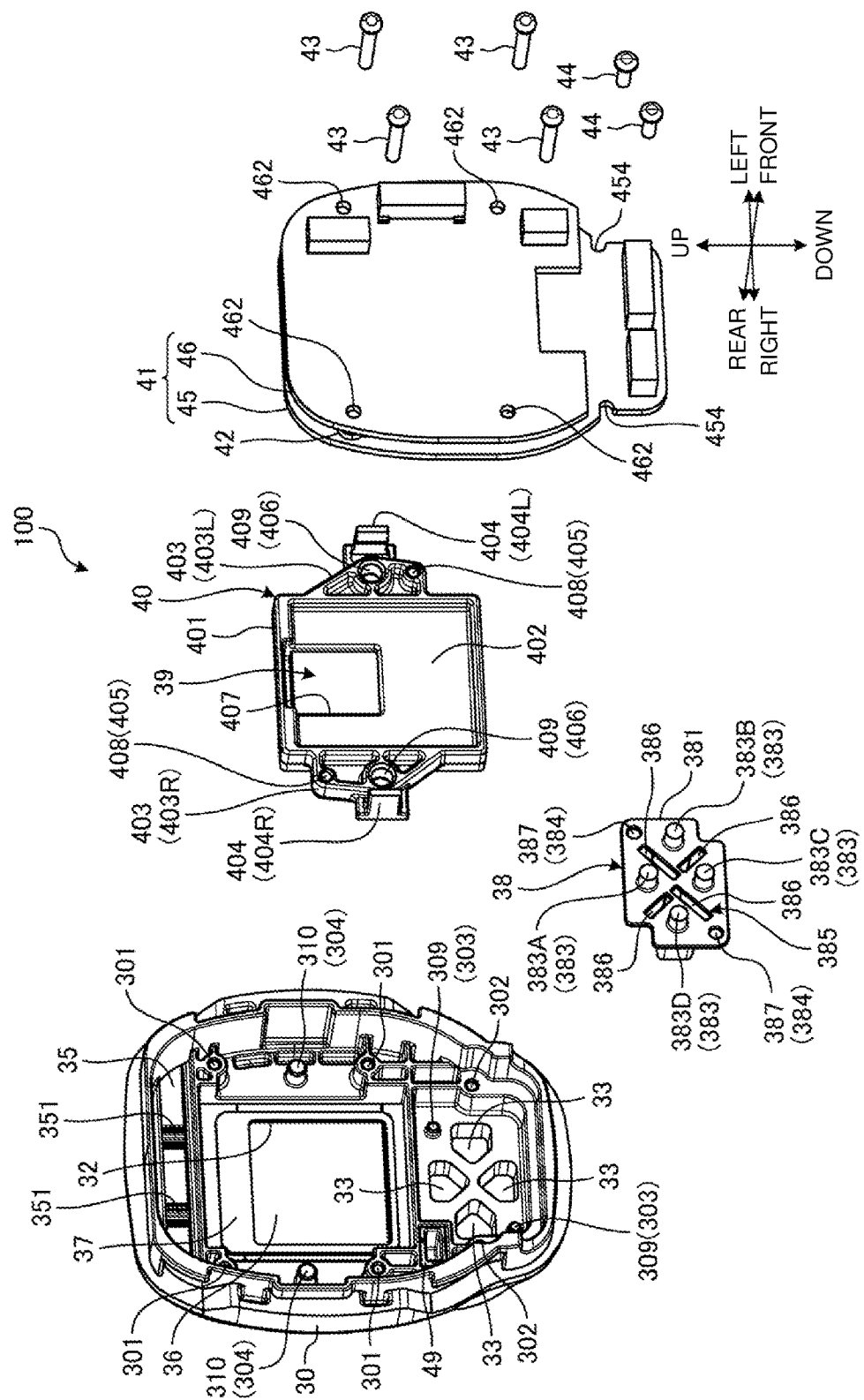
FIG. 10 is an exploded perspective view of the rear cover unit in the embodiment as viewed from the right front.

FIG. 7 is a perspective view of the rear cover unit 100 in the embodiment as viewed from the right rear. FIG. 8 is an exploded perspective view of the rear cover unit 100 in the embodiment as viewed from the right rear. FIG. 9 is a perspective view of the rear cover unit 100 in the embodiment as viewed from the right front. FIG. 10 is an exploded perspective view of the rear cover unit 100 in the embodiment as viewed from the right front.

As shown in FIGS. 7 to 10, the rear cover unit 100 includes the cover 30, an optical diffuser 35, a display cover 36, a seal 37, an operation member 38, a display panel 39, a holder 40, an optical member 49, an interface controller 41, a spacer 42, first screws 43, and second screws 44.

The interface controller 41 includes a first circuit board 45 and a second circuit board 46. The first circuit board 45 includes light-emitting devices 47, switching elements 48, and a light-emitting device 50. The first circuit board 45 includes two light-emitting devices 47. The first circuit board 45 includes four switching elements 48. The first circuit board 45 includes a single light-emitting device 50.

The rear cover unit 100 is held between the left housing 2L and the right housing 2R to be fastened to the motor compartment 21. As shown in FIG. 9, the cover 30 has protrusions 330 protruding from the periphery of the cover 30. The cover 30 has four protrusions 330. Two protrusions 330 protrude leftward from the left of the cover 30. The two protrusions 330 are arranged vertically on the left of the cover 30. Two protrusions 330 protrude rightward from the right of the cover 30. The two protrusions 330 are arranged vertically on the right of the cover 30.

As shown in FIG. 6, the motor compartment 21 has grooves 25 on its inner surface. The grooves 25 receive the protrusions 330. Two grooves 25 are located on the left housing 2L. Two grooves 25 are located on the right housing 2R. The protrusions 330 on the left of the cover 30 are received in the grooves 25 on the left housing 2L. The protrusions 330 on the right of the cover 30 are received in the grooves 25 on the right housing 2R.

To fasten the cover 30 to the motor compartment 21, the left housing 2L and the right housing 2R are fastened together with the screws 2S with the protrusions 330 on the left of the cover 30 received in the grooves 25 on the left housing 2L, and the protrusions 330 on the right of the cover 30 received in the grooves 25 on the right housing 2R. The cover 30 is thus held between the left housing 2L and the right housing 2R and fastened to the motor compartment 21. The protrusions 330 received in the grooves 25 position the cover 30 and the motor compartment 21. The protrusions 330 received in the grooves 25 restrict the cover 30 from slipping off the motor compartment 21 and from rotating relative to the motor compartment 21. The cover 30 is attachable to and detachable from the motor compartment 21. The left housing 2L and the right housing 2R fastened with the screws 2S are unfastened to detach the cover 30 from the motor compartment 21.

The optical diffuser 35 diffuses light from the light-emitting devices 47. The optical diffuser 35 is elongated in the lateral direction. The optical diffuser 35 includes incident surfaces 351 and an emission surface 352. The light-emitting devices 47 emit light. The light-emitting devices 47 face the optical diffuser 35. The light-emitting devices 47 are located frontward from the optical diffuser 35. Light from the light-emitting devices 47 enters the incident surfaces 351. The optical diffuser 35 diffuses light incident on the incident surfaces 351 and emits the light through the emission surface 352. The emission surface 352 emits diffused light rearward. The indication light emitter 100A includes the emission surface 352 of the optical diffuser 35.

The optical diffuser 35 is fixed to the cover 30. The optical diffuser 35 is at least partially received in the indication opening 31. The optical diffuser 35 is formed from synthetic resin such as a polycarbonate resin. In some embodiments, a light diffusing material may be dispersed in the synthetic resin used for the optical diffuser 35.

The display cover 36 covers the display opening 32. The display cover 36 is a transparent sheet.

The display cover 36 is fixed to the cover 30. The display cover 36 is formed from synthetic resin such as a polycarbonate resin.

The optical member 49 transmits light from the light-emitting device 50. The light-emitting device 50 emits light. The light-emitting device 50 faces the optical member 49. The light-emitting device 50 is located frontward from the optical member 49. Light from the light-emitting device 50 enters the optical member 49. The optical member 49 emits incident light rearward. The communication light emitter 100D includes an emission surface of the optical member 49.

The optical member 49 is fixed to the cover 30. The optical member 49 is at least partially received in the communication opening 34. The optical member 49 is formed from synthetic resin such as a polycarbonate resin.

The optical diffuser 35, the display cover 36, and the optical member 49 are fixed to the cover 30 by insert molding. The synthetic resin for forming the cover 30 is injected into a mold for insert molding in which the optical diffuser 35, the display cover 36, and the optical member 49 are placed. This completes the cover 30 to which the optical diffuser 35, the display cover 36, and the optical member 49 are fixed.

The seal 37 seals a space between the display panel 39 and the display cover 36. The seal 37 is an elastically deformable sheet. The seal 37 is a rectangular ring. The seal 37 is located between the display panel 39 and the display cover 36. The seal 37 is formed from a cushiony material such as polyurethane foam rubber. The seal 37 is in contact with at least a part of the display panel 39. The seal 37 is in contact with at least a part of the display cover 36. The seal 37 also serves as a buffer to reduce an impact on the display panel 39. The display panel 39 includes a display screen 391 facing rearward. With the display panel 39 in contact with the seal 37, the space between the display screen 391 and the front surface of the display cover 36 is closed.

The operation member 38 is operable to control the display panel 39. The operation member 38 is supported by the cover 30. The operation member 38 is elastically deformable. The operation member 38 in the embodiment is formed from rubber. The operation member 38 is at least partially received in the operation openings 33.

The operation member 38 includes a plate 381, buttons 382, and operation protrusions 383.

The plate 381 faces the front surface of the cover 30. The buttons 382 protrude rearward from the rear surface of the plate 381. The operation protrusions 383 protrude frontward from the front surface of the plate 381.

The buttons 382 are placed though the operation openings 33. The operation member 38 includes four buttons 382. Each button 382 is placed through its corresponding operation opening 33. The operation unit 100C includes the buttons 382.

The operation protrusions 383 face the switching elements 48. The operation member 38 includes four operation protrusions 383. Each operation protrusion 383 faces its corresponding switching element 48.

The display panel 39 displays the setting status of the output unit 8. The display panel 39 displays display-data indicating the setting status of the output unit 8.

The display panel 39 includes a flat panel display. The display panel 39 in the embodiment is an organic electroluminescent (EL) panel including an organic EL display. In some embodiments, the display panel 39 may be a liquid crystal panel including a liquid crystal display. The display panel 39 is rectangular. The display screen 391 in the display panel 39 faces rearward. The back surface of the display panel 39 faces frontward.

The display screen 391 is at least partially in the same plane with the display opening 32. The display screen 391 faces the display cover 36. The display cover 36 protects the display screen 391. The seal 37 is in contact with the periphery of the display screen 391. The display 100B includes the display screen 391.

The holder 40 holds the display panel 39. The holder 40 is fixed to the cover 30 with the display screen 391 in the display panel 39 received in the display opening 32. The holder 40 is formed from a material having high hardness and high strength. The holder 40 is formed from an impact-resistant material.

The holder 40 is formed from metal such as aluminum, stainless steel, iron, and copper. In some embodiments, the holder 40 may be formed from synthetic resin such as a nylon resin and a polycarbonate resin.

The holder 40 includes a frame 401, a plate 402, support plates 403, and hooks 404. The frame 401, the plate 402, the support plates 403, and the hooks 404 are integral with one another. In some embodiments, the frame 401 may be separate from the hooks 404. The hooks 404 may be formed from synthetic resin different from the synthetic resin used for the frame 401.

The frame 401 at least partially surrounds the plate 402. The frame 401 at least partially surrounds the side surfaces of the display panel 39.

The plate 402 faces the back surface of the display panel 39.

The support plates 403 protrude from the sides of the frame 401. The support plates 403 include a left support plate 403L and a right support plate 403R. The left support plate 403L protrudes from the left side of the frame 401. The right support plate 403R protrudes from the right side of the frame 401.

The hooks 404 are each located on the front end of the corresponding support plate 403. The hooks 404 are elastically deformable. The hook 404 are hooked on the periphery of the first circuit board 45. The hooks 404 include a left hook 404L and a right hook 404R. The left hook 404L is located on the left edge of the left support plate 403L. The right hook 404R is located on the right edge of the right support plate 403R. The left hook 404L is hooked on the left edge of the first circuit board 45. The right hook 404R is hooked on the right edge of the first circuit board 45.

The interface controller 41 includes a computer system. The interface controller 41 controls the rear cover unit 100. The interface controller 41 includes the first circuit board 45 and the second circuit board 46.

The first circuit board 45 includes a printed wiring board and multiple electronic components mounted on the printed wiring board. Examples of the electronic components mounted on the printed wiring board include a processor such as a central processing unit (CPU), a nonvolatile memory such as a read-only memory (ROM) or a storage device, a volatile memory such as a random-access memory (RAM), a transistor, a capacitor, and a resistor.

The light-emitting devices 47 emit light. The light-emitting devices 47 include LEDs. The light-emitting devices 47 are supported on the first circuit board 45. The light-emitting devices 47 are mounted on the printed wiring board in the first circuit board 45. The light-emitting devices 47 are located on the rear surface of the first circuit board 45. The light-emitting devices 47 emit light rearward. The light-emitting devices 47 are located in an upper portion of the first circuit board 45. The light-emitting devices 47 emit light toward the optical diffuser 35. The first circuit board 45 includes two light-emitting devices 47 arranged laterally.

When operated, the switching elements 48 output operation signals. The switching elements 48 are on-off switches. The switching elements 48 include push-buttons. When pushed, the switching elements 48 output operation signals. The switching elements 48 are supported on the first circuit board 45. The switching elements 48 are mounted on the printed wiring board in the first circuit board 45. The switching elements 48 are located on the rear surface of the first circuit board 45. The switching elements 48 are located in a lower portion of the first circuit board 45. The switching elements 48 are operable with the operation member 38. The first circuit board 45 includes four switching elements 48.

The light-emitting device 50 emits light. The light-emitting device 50 includes LEDs. The light-emitting device 50 is supported on the first circuit board 45. The light-emitting device 50 is mounted on the printed wiring board in the first circuit board 45. The light-emitting device 50 is located on the rear surface of the first circuit board 45. The light-emitting device 50 emits light rearward. The light-emitting device 50 is located in a right portion of the first circuit board 45. The light-emitting device 50 emits light toward the optical member 49. The first circuit board 45 includes a single light-emitting device 50.

The second circuit board 46 faces the first circuit board 45. The second circuit board 46 is located frontward from the first circuit board 45. Similarly to the first circuit board 45, the second circuit board 46 includes a printed wiring board and multiple electronic components mounted on the printed wiring board. The first circuit board 45 and the second circuit board 46 are connected to each other. The wireless communication device 1000 is supported on the second circuit board 46.

As shown in FIGS. 4 and 6, a third circuit board 501 faces the second circuit board 46. The third circuit board 501 is accommodated in the motor compartment 21. The third circuit board 501 is located frontward from the second circuit board 46. The third circuit board 501 includes a universal serial bus (USB) circuit. A cover 500 is located above the third circuit board 501.

A lead wire 700 is connected to the third circuit board 501. A connector 502 is fixed on the third circuit board 501. The lead wire 700 has one end connected to the third circuit board 501 with the connector 502. The lead wire 700 has the other end connected to a connector 900. The connector 900 includes a USB connector. The connector 900 is connected to the second circuit board 46 in a detachable manner.

The motor compartment 21 accommodates a line filter 800 and a rib 1001. The line filter 800 and the rib 1001 are located frontward from the second circuit board 46. The line filter 800 is cylindrical. The line filter 800 is located below the third circuit board 501. The rib 1001 extends from the inner surface of the left housing 2L. The rib 1001 is located rearward from the line filter 800. The lead wire 700 is at least partially supported by the line filter 800. The lead wire 700 is at least partially wound around the line filter 800. The lead wire 700 is at least partially placed between the rib 1001 and the line filter 800.

To change the setting for the output unit 8, a personal computer is connected to the third circuit board 501 and transmits, to the third circuit board 501, a change command for changing the setting for the output unit 8. The personal computer and the third circuit board 501 communicate with each other in accordance with the USB standard. The change command transmitted to the third circuit board 501 is transmitted to the second circuit board 46 in the interface controller 41 with the lead wire 700.

The third circuit board 501 is separate from the second circuit board 46. The third circuit board 501 and the second circuit board 46 are connected to each other with the lead wire 700 and the connector 900. Thus, when the third circuit board 501 or the connector 900 has a failure or is damaged, the third circuit board 501 or the connector 900 may be replaced or repaired. The wireless communication device 1000 is supported on the second circuit board 46. The rib 1001 and the line filter 800 are located frontward from the wireless communication device 1000. The wireless communication device 1000 is thus distanced from the third circuit board 501.

In some embodiments, to change the setting for the output unit 8, a change command may be transmitted from a personal computer to the interface controller 41 through the wireless communication device 1000.

The spacer 42 is located between the first circuit board 45 and the second circuit board 46. The second circuit board 46 faces the first circuit board 45 with the spacer 42 in between. The first circuit board 45 has a larger dimension than the second circuit board 46 in the vertical direction. The first circuit board 45 has the lower end located downward from the lower end of the second circuit board 46. The first circuit board 45 and the second circuit board 46 are connected to each other with the spacer 42 in between.

The spacer 42 includes two positioning protrusions 421. The first circuit board 45 has two board openings 451. The positioning protrusions 421 are placed in the board openings 451. The positioning protrusions 421 protrude rearward through the rear surface of the first circuit board 45.

The first screws 43 fasten the cover 30, the first circuit board 45, the spacer 42, and the second circuit board 46 together. The rear cover unit 100 includes four first screws 43.

The cover 30 has four screw holes 301. Each screw hole 301 receives the distal end of its corresponding first screw 43. The first circuit board 45 has four screw openings 452. The second circuit board 46 has four screw openings 462. Each screw opening 452 receives at least a part of its corresponding first screw 43. Each screw opening 462 receives at least a part of its corresponding first screw 43.

The second screws 44 fasten the cover 30 and the first circuit board 45 together. The second screws 44 fasten the cover 30 and the first circuit board 45 without fastening the spacer 42 and the second circuit board 46 in between. The first circuit board 45 has the lower end located downward from the lower end of the second circuit board 46. The second screws 44 fasten a lower portion of the first circuit board 45 and the cover 30. The second screws 44 are located below the first screws 43.

The cover 30 has screw holes 302. Each screw hole 302 receives the distal end of its corresponding second screw 44. The screw holes 302 are at least partially located around the operation member 38.

The rear cover unit 100 includes two second screws 44. The cover 30 has two screw holes 302, one located on the left of the operation member 38, and the other on the right of the operation member 38.

The first circuit board 45 has screw recesses 454 on its side portions. The first circuit board 45 has two screw recesses 454, one recessed rightward from a left portion on the periphery of the first circuit board 45, and the other recessed leftward from a right portion on the periphery of the first circuit board 45. Each screw recess 454 receives at least a part of its corresponding second screw 44.

The first circuit board 45 supports the holder 40. The first circuit board 45 is located rearward from the holder 40. The first circuit board 45 faces the plate 402 in the holder 40. The holder 40 includes the hooks 404. The left hook 404L is hooked on the left edge of the first circuit board 45. The right hook 404R is hooked on the right edge of the first circuit board 45. The hooks 404 hooked on the periphery of the first circuit board 45 connect the holder 40 to the first circuit board 45.

The first circuit board 45 includes positioners 453. The positioners 453 position the holder 40. The positioners 453 include the positioning protrusions 421 in the spacer 42 protruding rearward through the rear surface of the first circuit board 45. The positioning protrusions 421 received in the board openings 451 protrude rearward through the rear surface of the first circuit board 45.

The holder 40 includes positioners 405. The positioners 405 are positioned by the positioners 453. The positioners 405 have positioning openings 408 at least partially located in the holder 40. The positioning openings 408 in the embodiment are in the support plates 403.

The positioning protrusions 421 in the positioner 453 received in the positioning openings 408 in the positioner 405 position the first circuit board 45 and the holder 40.

The cover 30 includes positioners 303. The positioners 303 position the operation member 38. The positioners 303 include positioning protrusions 309 protruding frontward from the front surface of the cover 30.

The operation member 38 includes positioners 384. The positioners 384 are positioned by the positioners 303. The positioners 384 have positioning openings 387 at least partially located in the operation member 38. The positioning openings 387 in the embodiment are in the plate 381.

The positioning protrusions 309 in the positioners 303 received in the positioning openings 387 in the positioners 384 position the cover 30 and the operation member 38 relative to each other. The buttons 382 are received in the operation openings 33 with the positioning protrusions 309 in the positioner 303 received in the positioning openings 387 in the positioner 384.

The cover 30 includes positioners 304. The positioners 304 position the holder 40. The positioners 304 include positioning protrusions 310 protruding frontward from the front surface of the cover 30.

The holder 40 includes positioners 406. The positioners 406 are positioned by the positioners 304. The positioners 406 include positioning openings 409 at least partially located in the holder 40. The positioning openings 409 in the embodiment are in the support plates 403.

The positioning protrusions 310 in the positioners 304 received in the positioning openings 409 in the positioners 406 position the cover 30 and the holder 40 relative to each other. The display panel 39 held by the holder 40 faces the display cover 36 with the positioning protrusions 310 in the positioner 304 received in the positioning openings 409 in the positioner 406. The display panel 39 held by the holder 40 is in the same plane with the display opening 32 with the positioning protrusions 310 in the positioners 304 received in the positioning openings 409 in the positioners 406. The periphery of the display screen 391 in the display panel 39 is in contact with the seal 37.

With the cover 30 and the operation member 38 positioned relative to each other and the cover 30 and the holder 40 positioned relative to each other, the first screws 43 are received in the screw holes 301 through the screw opening 452 in the first circuit board 45 and the screw openings 462 in the second circuit board 46. Threads on the first screws 43 are engaged with threaded grooves on the screw holes 301 to fasten the cover 30, the first circuit board 45, and the second circuit board 46 together.

With the cover 30, the first circuit board 45, and the second circuit board 46 fastened together, the light-emitting devices 47 face the optical diffuser 35 and the switching elements 48 face the operation protrusions 383. With the periphery of the display screen 391 in the display panel 39 pressed against the seal 37, the display screen 391 in the display panel 39 faces the front surface of the display cover 36.

Operation Member

Figure 11:
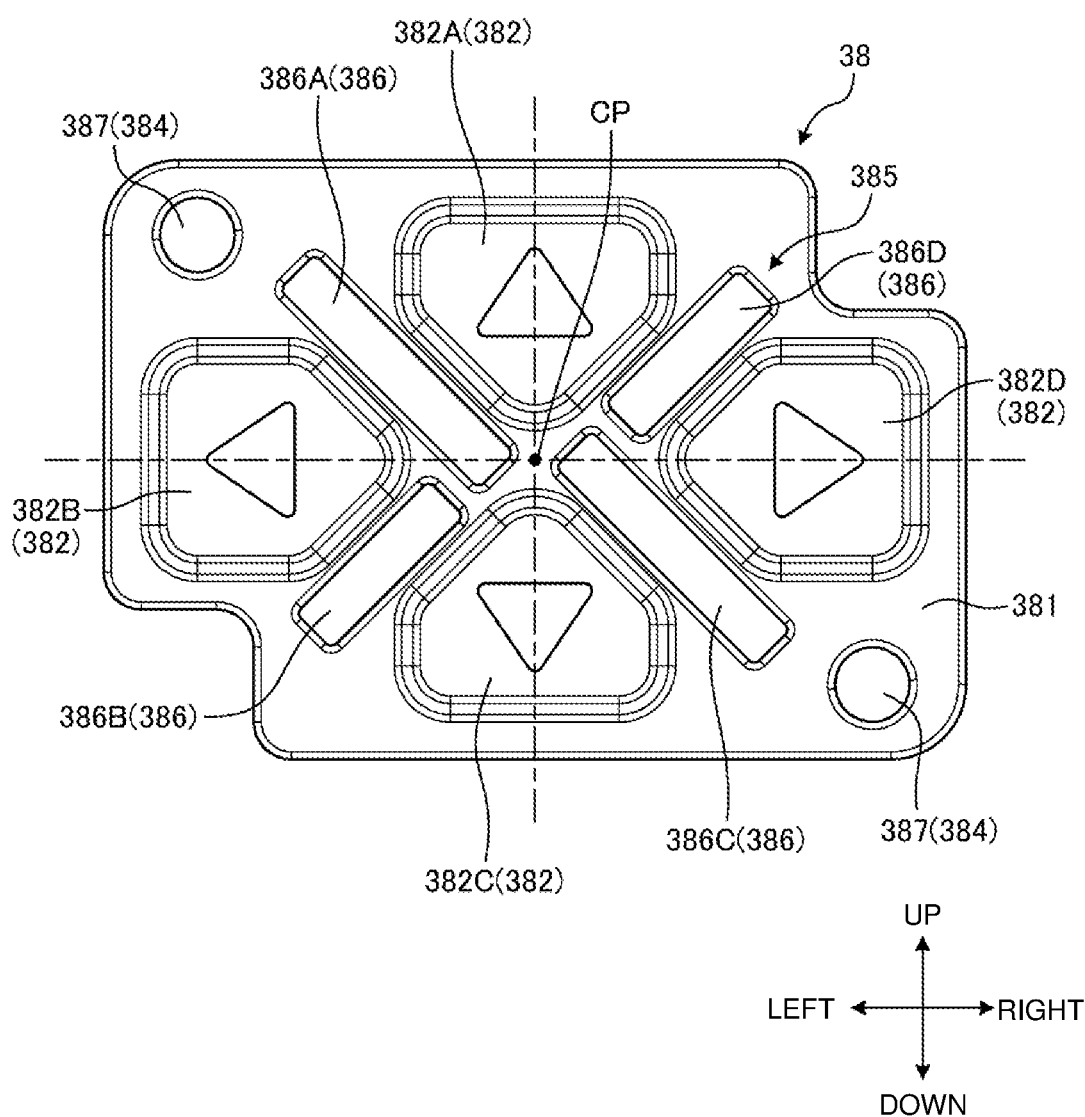
FIG. 11 is a rear view of an operation member in the embodiment.

FIG. 11 is a rear view of the operation member 38 in the embodiment. As shown in FIGS. 8, 10, and 11, the operation member 38 includes the plate 381, the buttons 382, and the operation protrusions 383. The buttons 382 protrude rearward from the rear surface of the plate 381. The operation protrusions 383 protrude frontward from the front surface of the plate 381. The plate 381, the buttons 382, and the operation protrusions 383 are integral with one another.

The multiple (four in the embodiment) buttons 382 surround a center point CP defined on the plate 381. The multiple buttons 382 surround the center point CP at a distance. The buttons 382 include a button 382A (first button), a button 382B (second button), a button 382C (third button), and a button 382D (fourth button). The buttons 382A, 382B, 382C, and 382D are respectively arranged upward, leftward, downward, or rightward from the center point CP. The buttons 382A to 382D surround the center point CP defined on the plate 381.

In the plane parallel to the surface of the plate 381, each button 382 is pentagonal. The buttons 382 have substantially the same shape and dimensions. Of the multiple corners of each button 382, the smallest interior corner points to the center point CP.

The operation protrusions 383 (four in the embodiment) surround the center point CP defined on the plate 381. The operation protrusions 383 surround the center point CP at a distance from one another. The operation protrusions 383 include an operation protrusion 383A (first operation protrusion), an operation protrusion 383B (second operation protrusion), an operation protrusion 383C (third operation protrusion), and an operation protrusion 383D (fourth operation protrusion). The operation protrusions 383A, 383B, 383C, and 383D are respectively arranged upward, leftward, downward, or rightward from the center point CP. The operation protrusions 383A to 383D surround the center point CP defined on the plate 381.

In the plane parallel to the surface of the plate 381, each operation protrusion 383 is circular. The operation protrusions 383 have substantially the same shape and dimensions.

In the plane parallel to the surface of the plate 381, the position of at least a part of the button 382A and the position of the operation protrusion 383A match with each other. More specifically, at least a part of the button 382A and the operation protrusion 383A overlap in the lateral and vertical directions. Similarly, at least a part of the button 382B and the operation protrusion 383B overlap in the lateral and vertical directions. At least a part of the button 382C and the operation protrusion 383C overlap in the lateral and vertical directions. At least a part of the button 382D and the operation protrusion 383D overlap in the lateral and vertical directions.

The first circuit board 45 includes four switching elements 48. The switching elements 48 include a switching element 48A (first switching element), a switching element 48B (second switching element), a switching element 48C (third switching element), and a switching element 48D (fourth switching element). The switching element 48A faces a front end of the operation protrusion 383A. The switching element 48B faces a front end of the operation protrusion 383B. The switching element 48C faces a front end of the operation protrusion 383C. The switching element 48D faces a front end of the operation protrusion 383D. The operation protrusions 383A to 383D protrude from the plate 381 to face their respective switching elements 48A to 48D.

The operator operates the operation member 38 to push any of the buttons 382 forward. When being pushed forward by the operator, the button 382 is displaced forward.

When the button 382A is displaced forward, the operation protrusion 383A moves forward to push the switching element 48A. In other words, the displacement of the button 382A operates the switching element 48A. The forward displacement of the button 382A pushes none of the switching elements 48B, 48C, and 48D.

When the button 382B is displaced forward, the operation protrusion 383B moves forward to push the switching element 48B. In other words, the displacement of the button 382B operates the switching element 48B. The forward displacement of the button 382B pushes none of the switching elements 48C, 48D, and 48A.

When the button 382C is displaced forward, the operation protrusion 383C moves forward to push the switching element 48C. In other words, the displacement of the button 382C operates the switching element 48C. The forward displacement of the button 382C pushes none of the switching elements 48D, 48A, and 48B.

When the button 382D is displaced forward, the operation protrusion 383D moves forward to push the switching element 48D. In other words, the displacement of the button 382D operates the switching element 48D. The forward displacement of the button 382D pushes none of the switching elements 48A, 48B, and 48C.

In the embodiment, an interlocked-movement restrictor 385 is arranged on at least a part of the plate 381. The interlocked-movement restrictor 385 restricts interlocked movement between a first one of the buttons 382 and a second one of the buttons 382. The interlocked-movement restrictor 385 restricts the first button 382 from shifting the second button 382. The interlocked-movement restrictor 385 is located between the first button 382 and the second button 382. In other words, the interlocked-movement restrictor 385 is located at the boundary between the buttons 382 adjacent to each other. When, for example, pushed forward, the button 382A is restricted by the interlocked-movement restrictor 385 from displacing the buttons 382B, 382C, and 382D forward. The interlocked-movement restrictor 385 enables independent operations of the four buttons 382.

The interlocked-movement restrictor 385 in the embodiment has one or more slits 386 in the plate 381. The slits 386 are straight in the embodiment. The slits 386 are located inward from the periphery of the plate 381, or extend without reaching the periphery of the plate 381.

The interlocked-movement restrictor 385 has four slits 386 in the embodiment. The slits 386 include a slit 386A (first interlocked-movement restrictor), a slit 386B (second interlocked-movement restrictor), a slit 386C (third interlocked-movement restrictor), and a slit 386D (fourth interlocked-movement restrictor).

The slits 386, or the slits 386A to 386D, extend radially from the center point CP. The slits 386A to 386D surround the center point CP.

In the circumferential direction with respect to the center point CP, the slit 386A is located between the buttons 382A and 382B, the slit 386B is located between the buttons 382B and 382C, the slit 386C is located between the buttons 382C and 382D, and the slit 386D is located between the buttons 382D and 382A.

Each of the slits 386A to 386D extends without reaching the periphery of the plate 381. In other words, the periphery of the plate 381 is not separated by the slits 386.

Each of the slits 386A to 386D extends without reaching the center point CP of the plate 381.

In other words, the slits 386A to 386D are spaced from each other, disconnected from each other, or independent of each other.

The slits 386A and 386B have different lengths. The slits 386C and 386D have different lengths. The slits 386A and 386C have substantially the same length. The slits 386B and 386D have substantially the same length. In the embodiment, the slits 386A and 386C are longer than the slits 386B and 386D. The slits 386A to 386D have the same width.

The lengths of the slits 386 refer to the dimensions in the radial directions from the center point CP. The width of the slits 386 refers to the dimension in the circumferential direction with respect to the center point CP.

The slits 386A and 386C are substantially parallel to each other. The slits 386B and 386D are substantially parallel to each other. The angle between the slits 386A and 386B is substantially 90°. The angle between the slits 386B and 386C is substantially 90°. The angle between the slits 386C and 386D is substantially 90°. The angle between the slits 386D and 386A is substantially 90°.

The plate 381 has two positioning openings 387, one at a first corner of the plate 381 and the other at a second corner of the plate 381. The first and second corners face each other. In other words, the two positioning openings 387 are located on a diagonal line passing through the first corner, the center point CP, and the second corner. The two positioning openings 387 receive the respective positioning protrusions 309 in the positioners 303. The positioners 303 position the cover 30 and the operation member 38 relative to each other at two opposite corners of the plate 381.

The buttons 382 are received in the operation openings 33. As described above, the cover 30 has the four operation openings 33. More specifically, the cover 30 has first to fourth operation openings 33. With the cover 30 and the operation member 38 positioned relative to each other, the buttons 382 are received in the respective operation openings 33. The buttons 382A to 382D are received in the respective first to fourth operation openings 33. The four buttons 382 received in the operation openings 33 protrude rearward through the rear surface of the cover 30. This arrangement allows the operator to push the buttons 382.

The interlocked-movement restrictor 385 is not limited to the slits 386. For example, the interlocked-movement restrictor 385 may include thin portions or bellows on at least a part of the plate 381.

Optical Diffuser

Figure 12:
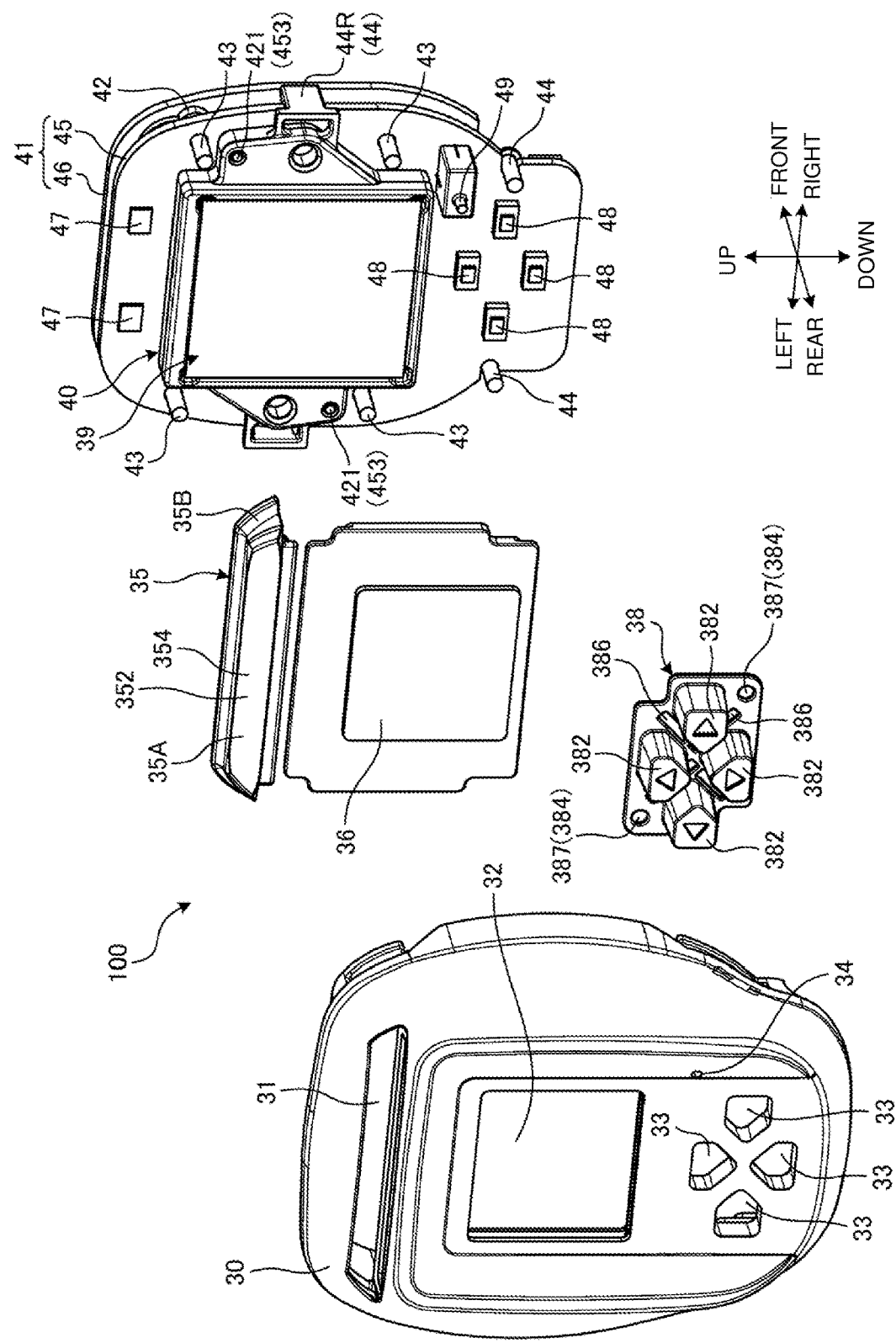
FIG. 12 is an exploded perspective view of the rear cover unit in the embodiment as viewed from the right rear.
Figure 13:
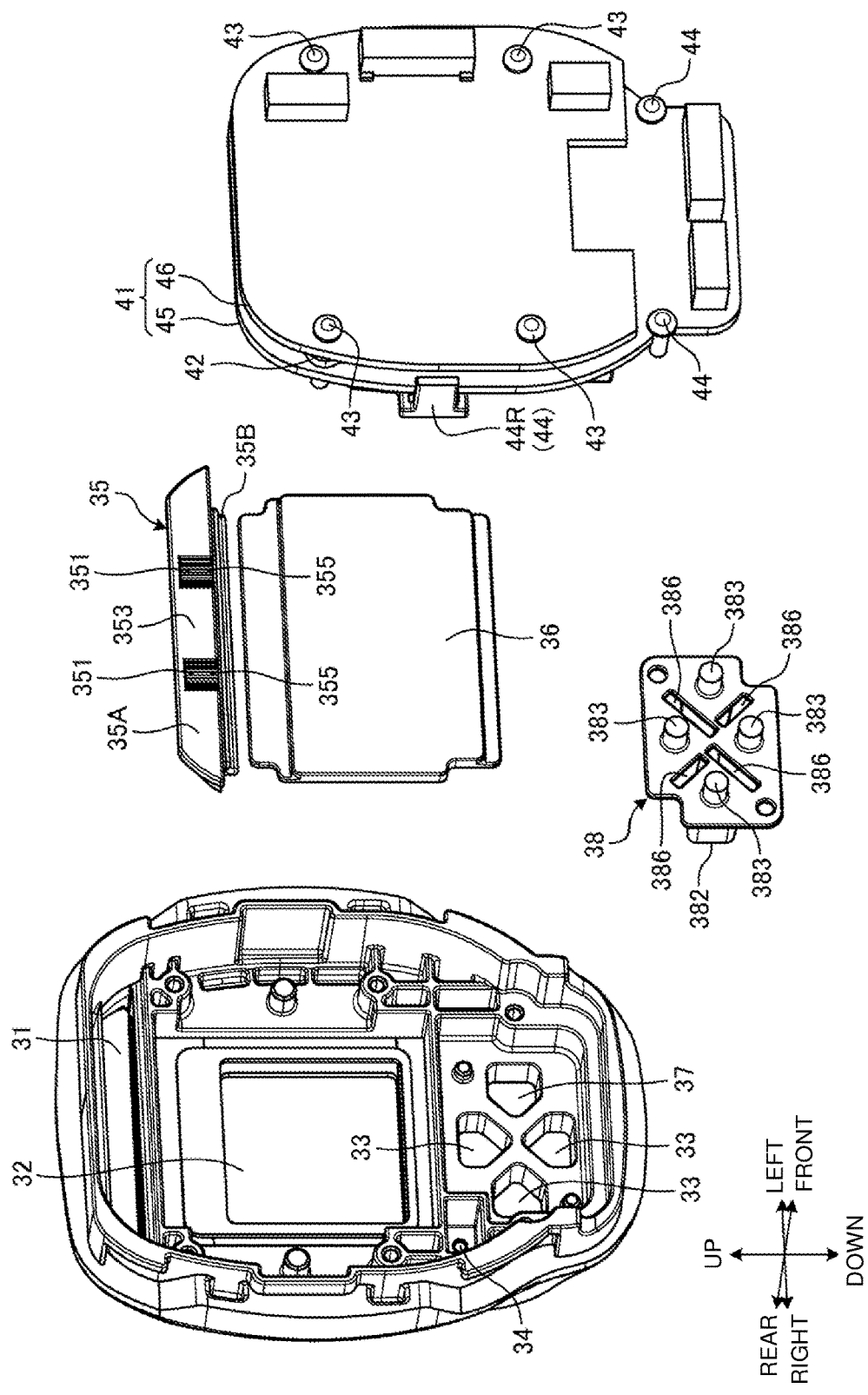
FIG. 13 is an exploded perspective view of the rear cover unit in the embodiment as viewed from the right front.
Figure 14:
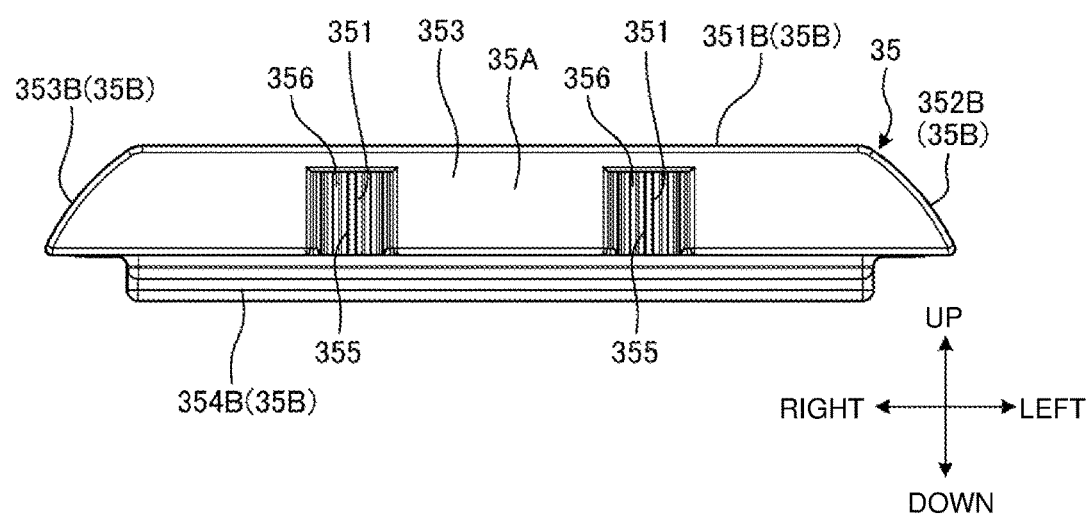
FIG. 14 is a front view of an optical diffuser in the embodiment.
Figure 15:
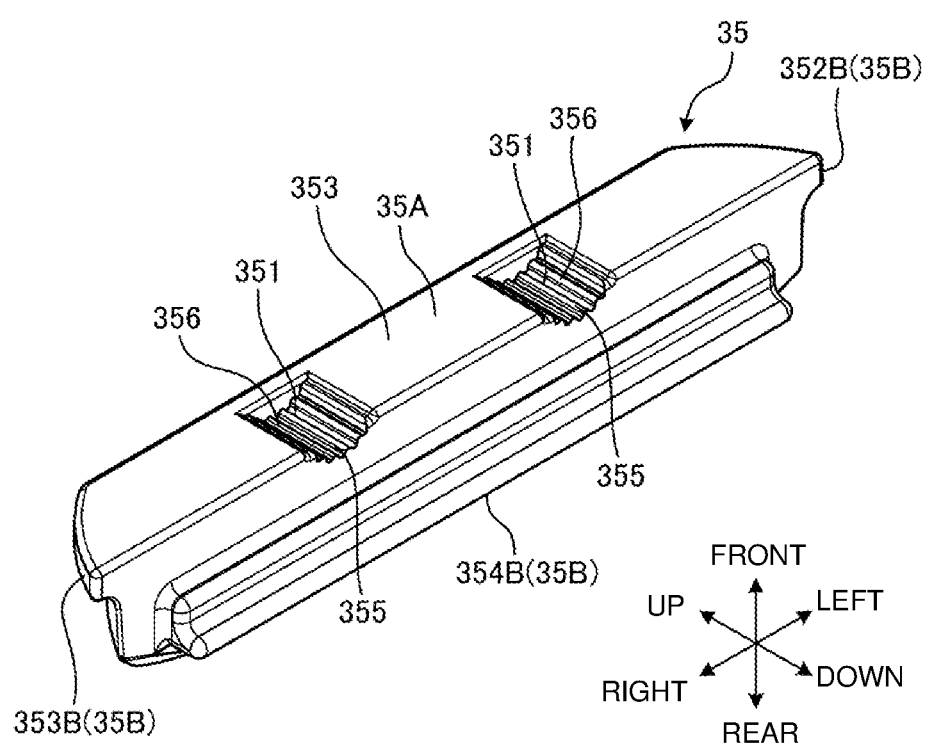
FIG. 15 is a perspective view of the optical diffuser in the embodiment as viewed from below.
Figure 16:
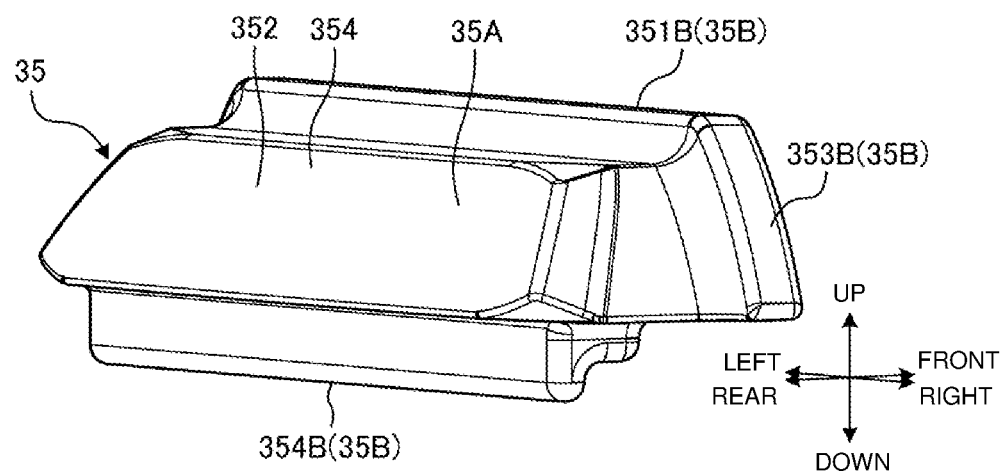
FIG. 16 is a perspective view of the optical diffuser in the embodiment as viewed from the right rear.
Figure 17:
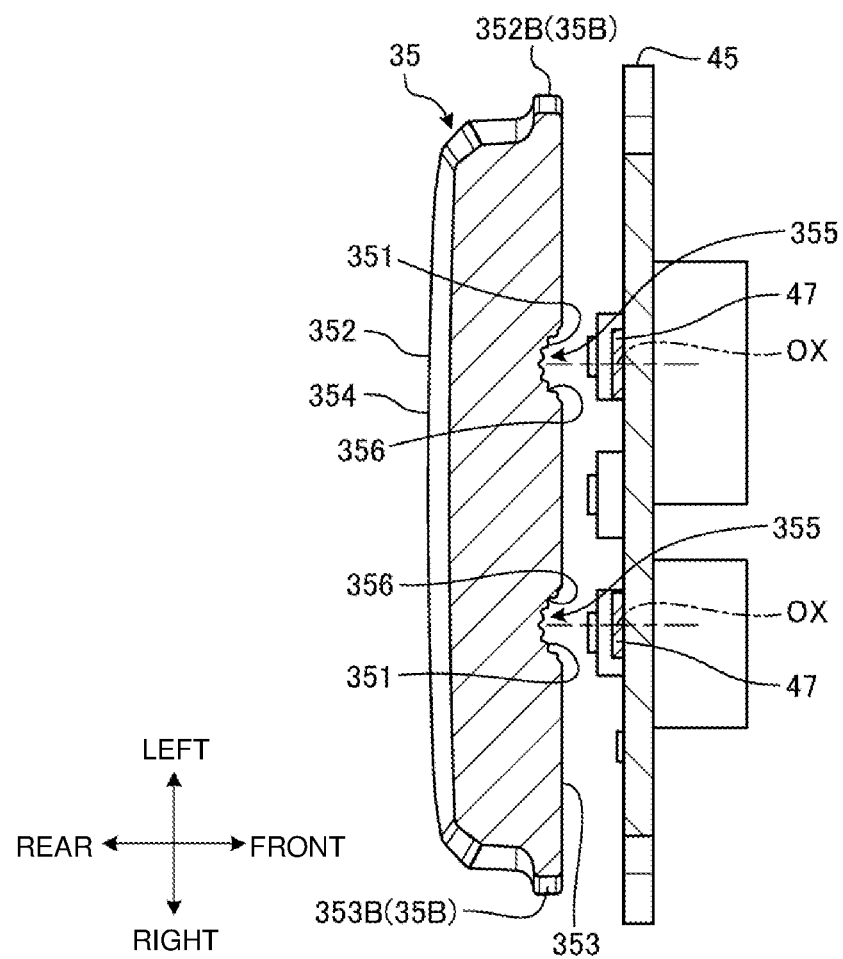
FIG. 17 is a view of the optical diffuser and light-emitting devices in the embodiment, showing their relationship.

FIG. 12 is an exploded perspective view of the rear cover unit 100 in the embodiment as viewed from the right rear. FIG. 13 is an exploded perspective view of the rear cover unit 100 in the embodiment as viewed from the right front. FIG. 14 is a front view of the optical diffuser 35 in the embodiment. FIG. 15 is a perspective view of the optical diffuser 35 in the embodiment as viewed from the bottom. FIG. 16 is a perspective view of the optical diffuser 35 in the embodiment as viewed from the right rear. FIG. 17 is a view of the optical diffuser 35 and the light-emitting devices 47 in the embodiment, showing their relationship.

The optical diffuser 35 is a transmission optical diffuser. The optical diffuser 35 is elongated in the lateral direction. The optical diffuser 35 has the incident surfaces 351 and the emission surface 352. The optical diffuser 35 includes a transmissive portion 35A and a connecting portion 35B. Light incident on the incident surfaces 351 at least partially passes through the transmissive portion 35A. The connecting portion 35B is located on at least a part of the periphery of the transmissive portion 35A. The transmissive portion 35A is elongated in the lateral direction. The incident surfaces 351 and the emission surface 352 are located in the transmissive portion 35A. The transmissive portion 35A is received in the indication opening 31 in the cover 30. The connecting portion 35B is fixed to the cover 30.

The incident surfaces 351 and the emission surface 352 are located at different positions in the front-rear direction. The incident surfaces 351 are located frontward from the emission surface 352. The optical diffuser 35 is fixed to the cover 30 with the incident surfaces 351 at least partially facing frontward, and the emission surface 352 at least partially facing rearward.

The transmissive portion 35A has a front surface 353, a rear surface 354, and recesses 355. The front surface 353 has the recesses 355. The front surface 353 faces frontward. The rear surface 354 at least partially faces rearward. The front surface 353 and the rear surface 354 are elongated in the lateral direction.

The front surface 353 is flat. The front surface 353 is orthogonal to the axis parallel to an optical axes OX of the light-emitting devices 47. The optical axes OX of the light-emitting devices 47 extend in the front-rear direction. The optical axes OX of the light-emitting devices 47 in the embodiment are parallel to the rotation axis AX of the motor 5.

The recesses 355 are recessed rearward from the front surface 353. The transmissive portion 35A has two recesses 355 arranged to the left and right at a distance from each other.

The incident surfaces 351 include inner surfaces of the recesses 355. The emission surface 352 includes the rear surface 354.

The inner surface of each recess 355 has multiple grooves 356 extending in the vertical direction. The grooves 356 on the inner surface of each recess 355 are arranged in the lateral direction. The grooves 356 function as diffusers to diffuse light. The incident surfaces 351 with the grooves 356 function as diffusing surfaces to diffuse light.

The recesses 355 are substantially semi-cylindrical. As shown in FIG. 17, the inner surface of each recess 355 has a substantially arc-shaped cross section taken perpendicular to the front surface 353.

In the embodiment, the cross section taken perpendicular to the front surface 353 is parallel to a predetermined plane including a first axis parallel to the front-rear direction and a second axis parallel to the lateral direction. The cross section of the inner surface of each recess 355 taken parallel to the predetermined plane is uniform at multiple positions in the vertical direction. In other words, when each recess 355 serves as a semicylinder, the center axis of the semicylinder extends in the vertical direction.

The recess 355 is symmetric with respect to a reference line passing through the center of each recess 355 in the lateral direction and extending in the vertical direction. More specifically, the recess 355 is bilaterally symmetrical as viewed from the front.

As shown in FIG. 17, the light-emitting devices 47 face the incident surfaces 351. The incident surfaces 351 and the light-emitting devices 47 are spaced apart in the front-rear direction. The light-emitting devices 47 are supported on the first circuit board 45. The light-emitting devices 47 are located frontward from the front surface 353. The light-emitting devices 47 face the incident surfaces 351 outside the recesses 355.

The transmissive portion 35A includes two recesses 355 spaced apart in the lateral direction. More specifically, the transmissive portion 35A has two incident surfaces 351. The incident surfaces 351 in the embodiment include a first incident surface 351 and a second incident surface 351. The second incident surface 351 is located rightward from the first incident surface 351. The first incident surface 351 and the second incident surface 351 are spaced apart in the lateral direction.

The first circuit board 45 includes two light-emitting devices 47. The recesses 355 face the respective light-emitting devices 47. The light-emitting devices 47 include a first light-emitting device 47 and a second light-emitting device 47. The first light-emitting device 47 emits light that is incident on the first incident surface 351. The second light-emitting device 47 emits light that is incident on the second incident surface 351.

Light emitted from the light-emitting devices 47 is at least partially incident on the incident surfaces 351. The incident surfaces 351 diffuse light from the light-emitting devices 47. When each light-emitting device 47 serves as a point light source, the corresponding incident surface 351 converts light from the point light source to light of a surface light source. The incident surfaces 351 diffuse light from the light-emitting devices 47 in at least the lateral direction.

After being diffused by the incident surfaces 351, light incident on the incident surfaces 351 passes through the transmissive portion 35A and is emitted through the emission surface 352. The emission surface 352 emits light diffused by the incident surfaces 351.

The optical diffuser 35 is located in an upper portion of the cover 30. The emission surface 352 is located in the upper portion of the cover 30. The emission surface 352 is inclined with respect to the optical axis OX of each light-emitting device 47. In the embodiment, the emission surface 352 is at least partially inclined downward to the rear.

The emission surface 352 has a first end and a second end in the lateral direction. Both ends are located nearer the respective incident surfaces 351 in the front-rear direction than the center of the emission surface 352. More specifically, the left and right ends of the emission surface 352 are located frontward from the center of the emission surface 352. The emission surface 352 is curved from the center toward the left and right ends. More specifically, the emission surface 352 in the embodiment has a curved surface. The emission surface 352 is at least partially curved rearward.

The emission surface 352 emits at least part of light entering through the incident surfaces 351 rearward, or to the left rear and right rear, or to the upper rear and lower rear.

In the embodiment, the left and right ends of the emission surface 352 are located rearward from the rear end of the indication opening 31. More specifically, the left end of the emission surface 352 protrudes rearward from the rear surface of the cover 30 surrounding the left end of the emission surface 352. The right end of the emission surface 352 protrudes rearward from the rear surface of the cover 30 surrounding the right end of the emission surface 352.

The connecting portion 35B includes an upper connecting portion 351B, a left connecting portion 352B, a right connecting portion 353B, and a lower connecting portion 354B. The upper connecting portion 351B, the left connecting portion 352B, the right connecting portion 353B, and the lower connecting portion 354B are respectively located upward, leftward, rightward, and downward from the transmissive portion 35A.

The upper connecting portion 351B protrudes upward from an upper portion of the transmissive portion 35A. The upper connecting portion 351B extends in the lateral direction. The left connecting portion 352B protrudes leftward from a left portion of the transmissive portion 35A. The right connecting portion 353B protrudes rightward from a right portion of the transmissive portion 35A. The left end of the upper connecting portion 351B is continuous with the left connecting portion 352B. The right end of the upper connecting portion 351B is continuous with the right connecting portion 353B. The upper connecting portion 351B, the left connecting portion 352B, and the right connecting portion 353B surround a part of the front surface 353.

The lower connecting portion 354B protrudes downward from a lower portion of the transmissive portion 35A. The lower connecting portion 354B extends in the lateral direction.

Figure 18:
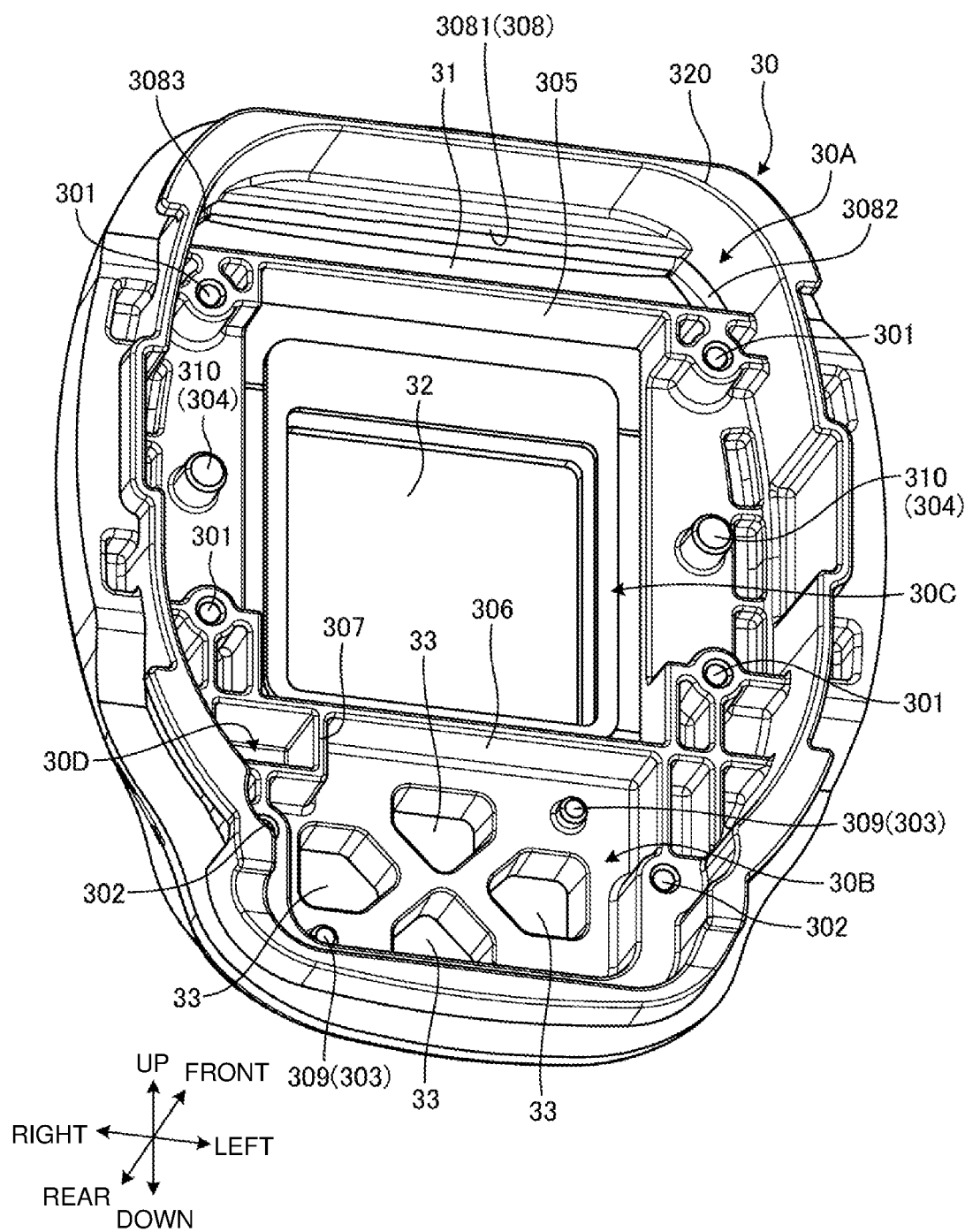
FIG. 18 is a perspective view of a cover in the embodiment as viewed from below.
Figure 19:
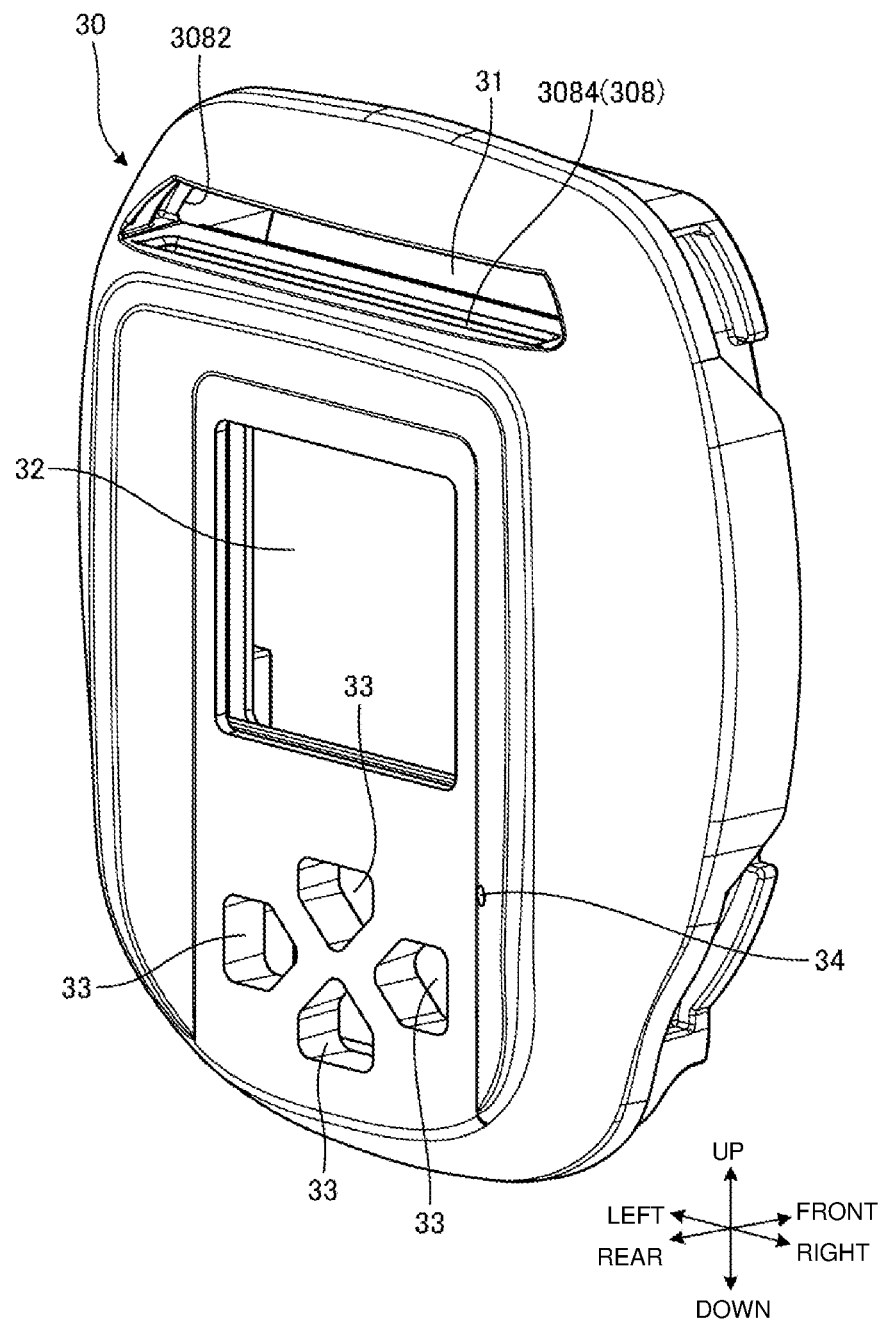
FIG. 19 is a perspective view of the cover in the embodiment as viewed from the right rear.

FIG. 18 is a perspective view of the cover 30 in the embodiment as viewed from the bottom. FIG. 19 is a perspective view of the cover 30 in the embodiment as viewed from the right rear.

As shown in FIG. 18, the cover 30 includes a peripheral wall 320, a partitioning wall 305, a partitioning wall 306, and a partitioning wall 307 on the front surface. The peripheral wall 320 extends along the periphery of the cover 30. The partitioning walls 305 to 307 are located inward from the peripheral wall 320.

The peripheral wall 320 and the partitioning walls 305 to 307 define a first partitioning space 30A, a second partitioning space 30B, a third partitioning space 30C, and a fourth partitioning space 30D. The first partitioning space 30A is defined by the peripheral wall 320 and the partitioning wall 305. The second partitioning space 30B is defined by the peripheral wall 320 and the partitioning wall 306. The third partitioning space 30C is defined by the peripheral wall 320 and the partitioning walls 305 and 306. The fourth partitioning space 30D is defined by the peripheral wall 320 and the partitioning wall 307. The first partitioning space 30A and the third partitioning space 30C are defined by the partitioning wall 305. The third partitioning space 30C and the second partitioning space 30B are defined by the partitioning wall 306. The second partitioning space 30B, the third partitioning space 30C, and the fourth partitioning space 30D are defined by the partitioning wall 307.

The first partitioning space 30A is located in the upper portion of the cover 30. The second partitioning space 30B is located in the lower portion of the cover 30. The third partitioning space 30C is located between the first partitioning space 30A and the second partitioning space 30B in the vertical direction. The fourth partitioning space 30D is located on the right of the second partitioning space 30B.

The incident surfaces 351 of the optical diffuser 35 and the light-emitting devices 47 are located in the first partitioning space 30A. The operation member 38 is located in the second partitioning space 30B. The display panel 39 and the holder 40 are located in the third partitioning space 30C. The optical member 49 is located in the fourth partitioning space 30D.

The incident surfaces 351 and the light-emitting devices 47 are located in the first partitioning space 30A. This arrangement restricts at least part of light emitted from the light-emitting devices 47 from leaking to the space outside the cover 30 through at least a part of the display opening 32, the operation openings 33, and the communication opening 34. The peripheral wall 320 and the partitioning walls 305 to 307 increase the strength of the cover 30.

The cover 30 defining the first partitioning space 30A has grooves 308 on its inner surface. The connecting portion 35B is at least partially received in the grooves 308. The grooves 308 include an upper groove 3081 and a lower groove 3084. The upper groove 3081 is formed on a top surface of the first partitioning space 30A. The lower groove 3084 is formed on a bottom surface of the first partitioning space 30A. The upper connecting portion 351B is received in the upper groove 3081. The lower connecting portion 354B is received in the lower groove 3084. The left connecting portion 352B is supported on a support surface 3082 located to the left of the first partitioning space 30A. The right connecting portion 353B is supported on a support surface 3083 located to the right of the first partitioning space 30A.

Display Panel and Holder

Figure 20:
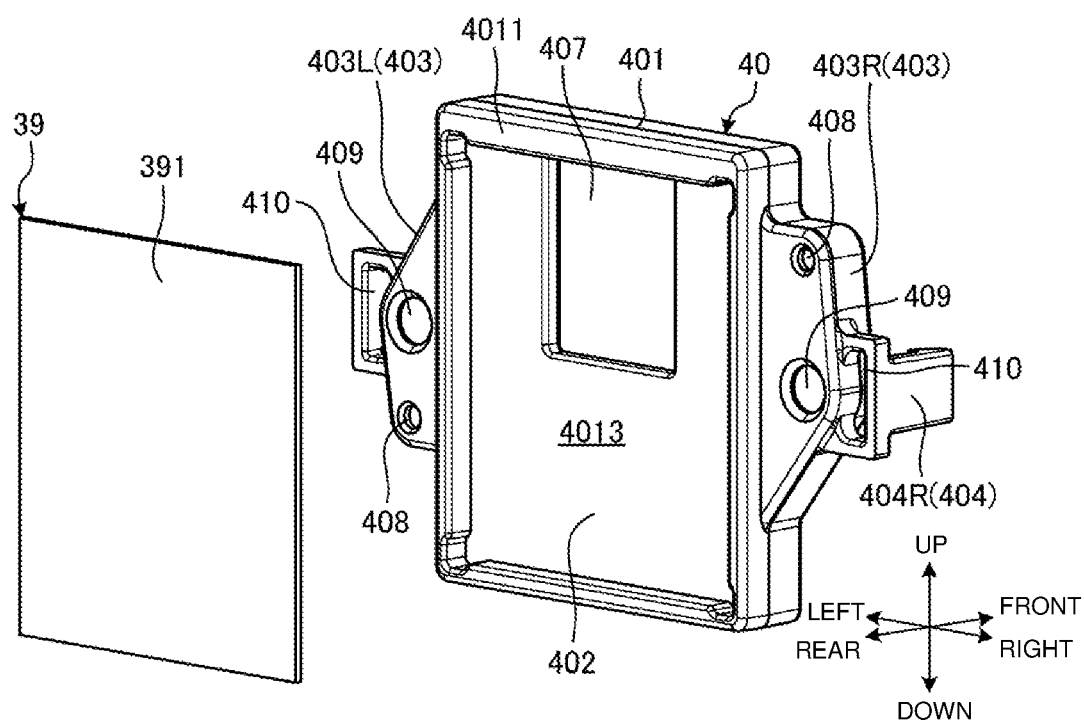
FIG. 20 is an exploded perspective view of a display panel and a holder in the embodiment as viewed from the right rear.
Figure 21:
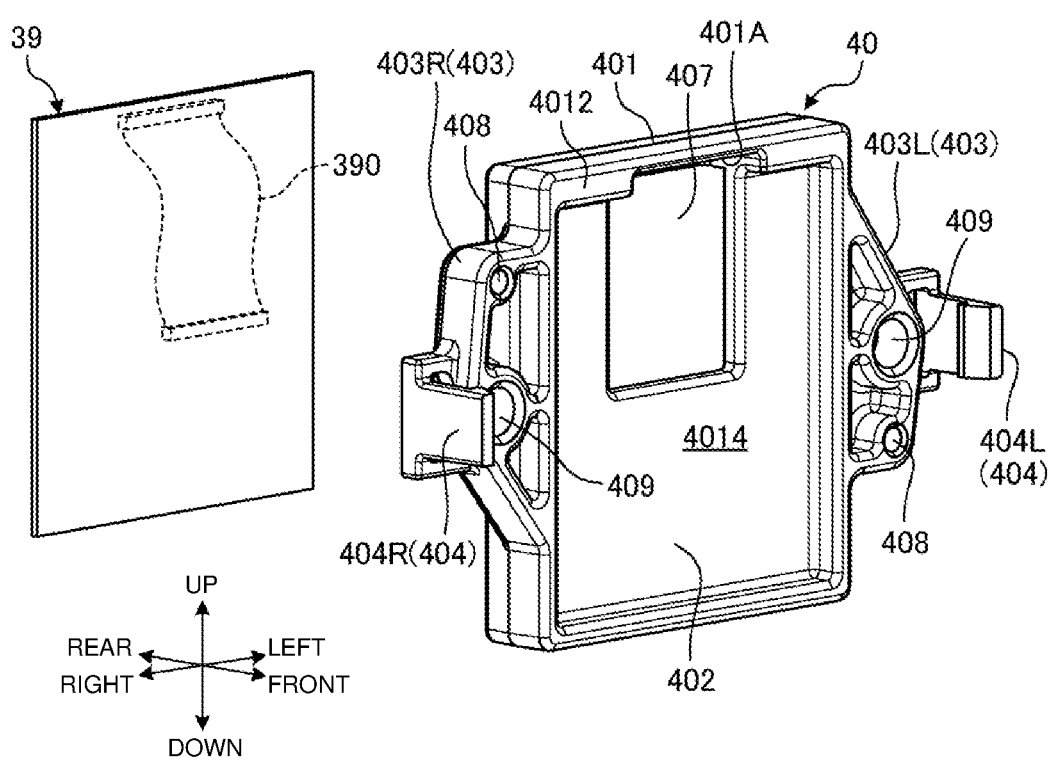
FIG. 21 is an exploded perspective view of the display panel and the holder in the embodiment as viewed from the right front.

FIG. 20 is an exploded perspective view of the display panel 39 and the holder 40 in the embodiment as viewed from the right rear. FIG. 21 is an exploded perspective view of the display panel 39 and the holder 40 in the embodiment as viewed from the right front.

The holder 40 includes the frame 401, the plate 402, the support plates 403, and the hooks 404.

The plate 402 at least partially has a connection opening 407. The connection opening 407 is located at the periphery of the plate 402. The connection opening 407 in the embodiment is located in an upper portion of the plate 402.

The connection opening 407 is rectangular. The display panel 39 and the first circuit board 45 in the interface controller 41 are connected with a connecting member 390 such as a flexible substrate or a lead wire. The display panel 39 and the interface controller 41 exchange data through the connecting member 390. The connecting member 390 is at least partially received in the connection opening 407. More specifically, with the display panel 39 held in the holder 40, the connecting member 390 extends through the connection opening 407.

The frame 401 has a recess 401A. The recess 401A is recessed away from the center of the connection opening 407. The recess 401A in the embodiment is located in an upper portion of the frame 401. The recess 401A is recessed upward away from the center of the connection opening 407. The connecting member 390 is at least partially positioned in the recess 401A.

The frame 401 includes a first portion 4011 and a second portion 4012. The first portion 4011 protrudes rearward from the periphery of the rear surface of the plate 402. The second portion 4012 protrudes frontward from the periphery of the front surface of the plate 402. More specifically, the second portion 4012 protrudes away from the first portion 4011.

The display panel 39 is located in a first space 4013. The first space 4013 is defined by the rear surface of the plate 402 and the inner surface of the first portion 4011. With the display panel 39 in the first space 4013, the rear end of the first portion 4011 is located rearward from the display screen 391. In other words, the first portion 4011 at least partially protrudes rearward from the display screen 391.

The front surface of the plate 402 and the second portion 4012 define a second space 4014. The second space 4014 accommodates at least a part of the connecting member 390.

Connection Structure Between Holder and Interface Controller

Figure 22:
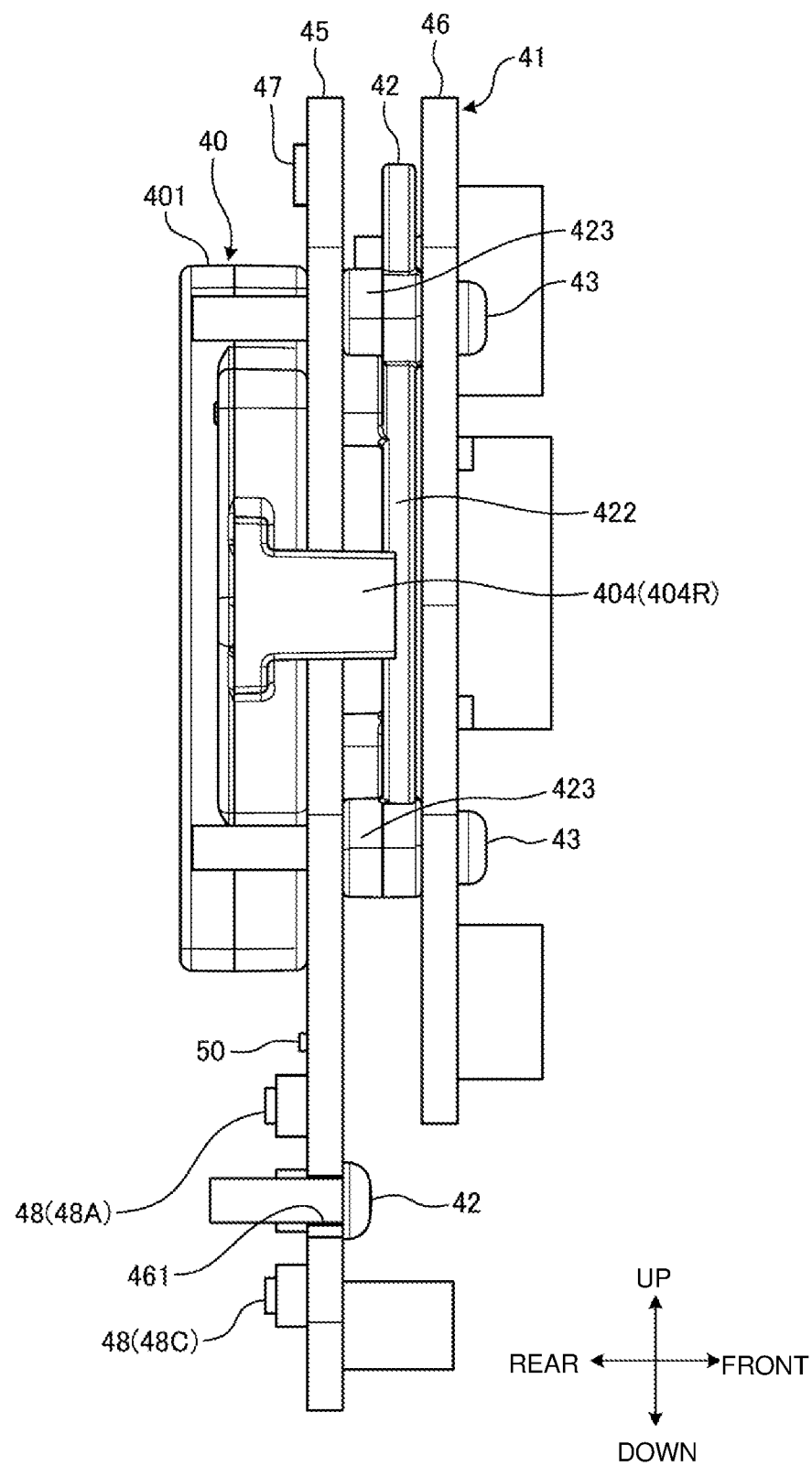
FIG. 22 is a side view of the holder and an interface controller in the embodiment, showing the connection between them.
Figure 23:
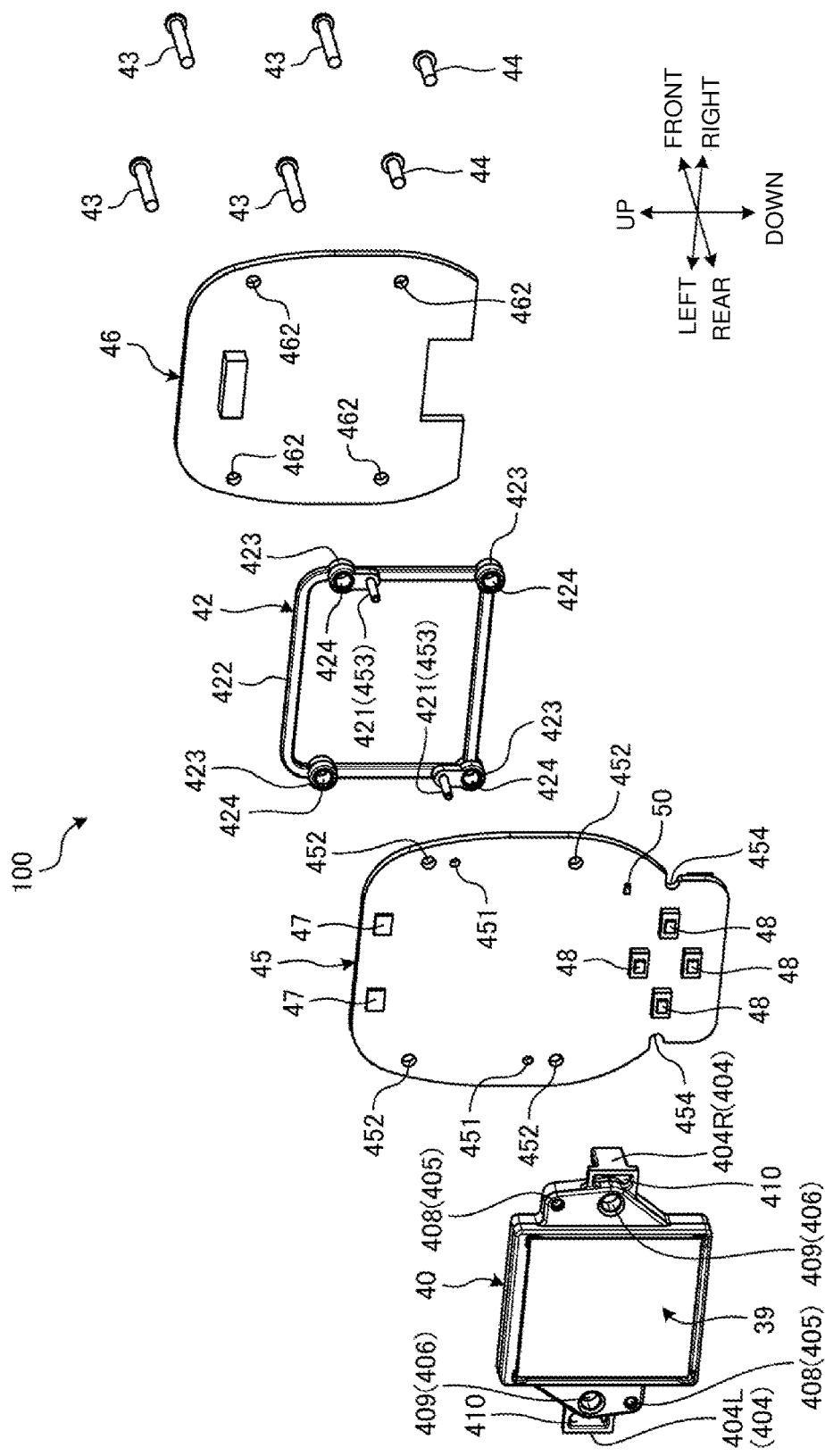
FIG. 23 is an exploded perspective view of the holder and the interface controller in the embodiment as viewed from the right rear, showing the connection between them.
Figure 24:
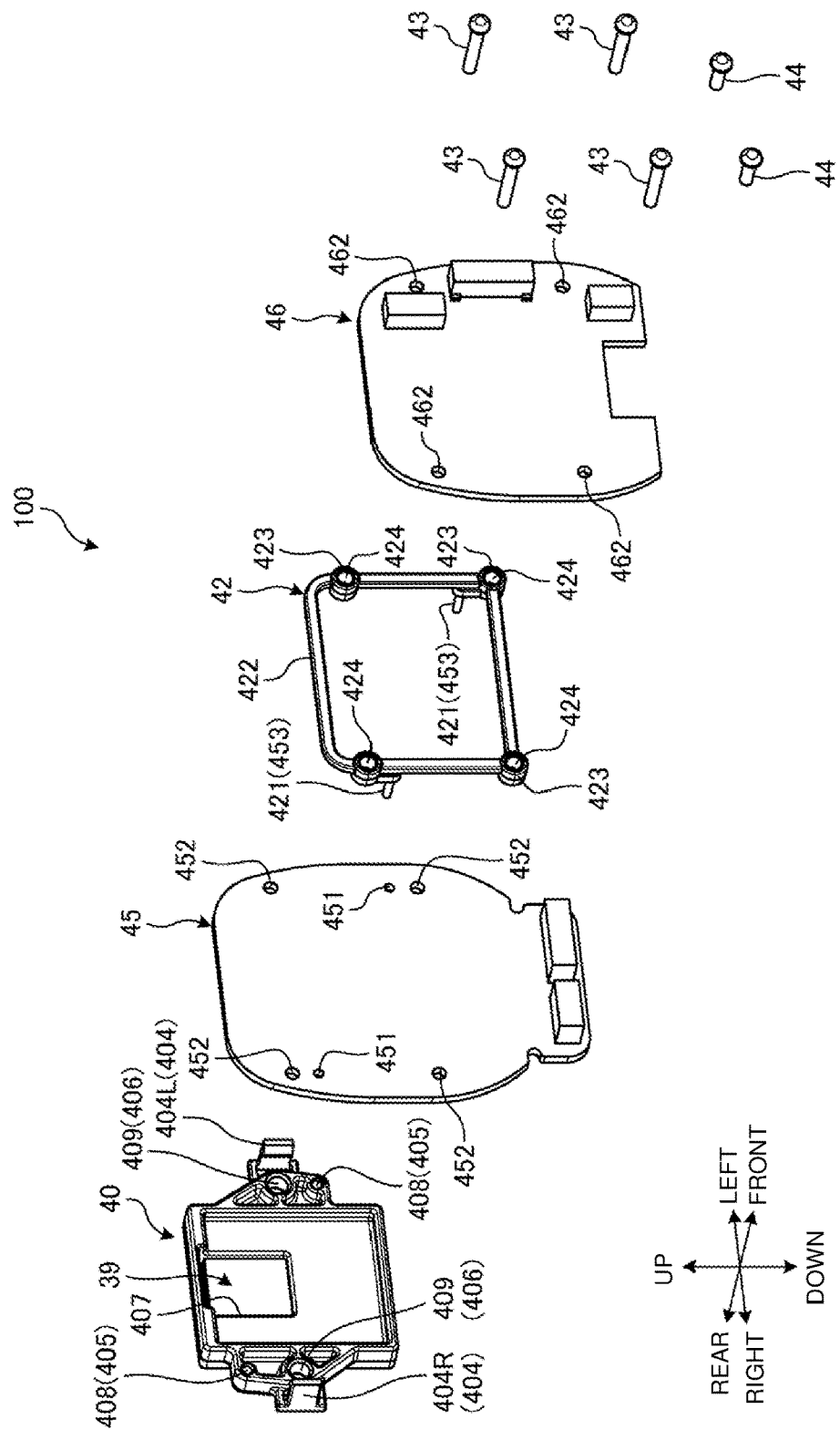
FIG. 24 is an exploded perspective view of the holder and the interface controller in the embodiment as viewed from the right front, showing the connection between them.

FIG. 22 is a side view of the holder 40 and the interface controller 41 in the embodiment, showing the connection between them. FIG. 23 is an exploded perspective view of the holder 40 and the interface controller 41 in the embodiment as viewed from the right rear, showing the connection between them. FIG. 24 is an exploded perspective view of the holder 40 and the interface controller 41 in the embodiment as viewed from the right front, showing the connection between them.

The hooks 404 couple the holder 40 to the first circuit board 45. The hooks 404 elastically deform to move the left hook 404L and the right hook 404R away from each other. Each hook 404 in the embodiment has a hook opening 410 at the rear. The hook opening 410 facilitates elastic deformation of the hook 404. When the left hook 404L and the right hook 404R are elastically deformed to move the left hook 404L leftward from the left edge of the first circuit board 45 and the right hook 404R rightward from the right edge of the first circuit board 45, the elastic deformation of the left hook 404L and the right hook 404R is released. The first circuit board 45 is thus held between the left hook 404L and the right hook 404R under the elastic force (restoring force) of the left hook 404L and the right hook 404R. The front end of each hook 404 is hooked on at least a part of the front surface of the first circuit board 45. Thus, the holder 40 is coupled with the first circuit board 45.

The spacer 42 is located between the first circuit board 45 and the second circuit board 46. The spacer 42 includes an annular portion 422, screw bosses 423, and the positioning protrusions 421. Each screw boss 423 includes a screw opening 424. Each first screw 43 is received in the corresponding screw opening 424.

The first screws 43 fasten the cover 30, the first circuit board 45, the spacer 42, and the second circuit board 46. The first screws 43 through the screw openings 462 in the second circuit board 46, the screw openings 424 in the spacer 42, and the screw openings 452 in the first circuit board 45 are received in the screw holes 301 in the cover 30. The cover 30, the first circuit board 45, the spacer 42, and the second circuit board 46 are thus fastened with the first screws 43.

An electronic component is mounted on the front surface of the first circuit board 45. An electronic component is mounted on the rear surface of the second circuit board 46. The spacer 42 prevents the electronic component mounted on the front surface of the first circuit board 45 and the electronic component mounted on the rear surface of the second circuit board 46 from coming into contact with each other.

The first circuit board 45 has the lower portion fastened to the cover 30 with the second screws 44. The switching elements 48 are located in the lower portion of the first circuit board 45. The lower portion of the first circuit board 45 is pushed rearward by the operator with the operation member 38 between them. The lower portion of the first circuit board 45 and the cover 30 are fastened together with the second screws 44. Thus, the first circuit board 45 is less likely to deform upon a rearward push at the lower portion.

Interface Controller

The interface controller 41 includes the first circuit board 45 and the second circuit board 46. The interface controller 41 controls at least the light-emitting devices 47 (indication light emitter 100A) and the display panel 39 (display 100B).

The interface controller 41 in the embodiment controls the light-emitting devices 47 based on at least the operation state of the output unit 8. More specifically, the interface controller 41 controls the light emission state of the indication light emitter 100A in response to the operation state of the output unit 8.

The interface controller 41 controls the display panel 39 based on at least the setting state of the output unit 8. More specifically, the interface controller 41 controls display-data appearing on the display 100B based on the setting state of the output unit 8. The interface controller 41 in the embodiment controls display-data appearing on the display screen 391 of the display panel 39 in response to the operation on the operation member 38 (operation unit 100C).

Operation of Screwing Machine

In a screwing operation, the main controller 15 activates the motor 5 to rotate the output unit 8 in response to operation signals from the trigger switch 11. When a screw is tightened into a workpiece in the screwing operation, the output unit 8 receives more torque. The torque applied to the output unit 8 is transmitted to the internal gear 70 through the carrier 72C and the planetary gears 72P. The torque applied to the internal gear 70 is transmitted to the torque sensor 9 through the front plate 91. The torque sensor 9 detects torque applied to the output unit 8.

The rear plate 92 in the torque sensor 9 is fastened to the gear case 3. The hollow portion 90 of the torque sensor 9 is twisted by the internal gear 70 in the rotation direction. The front plate 91 and the rear plate 92 also receive torque. However, the front plate 91 and the rear plate 92 have larger diameters than the hollow portion 90, and thus undergo less torsional deformation than the hollow portion 90. When the hollow portion 90 of the torque sensor 9 is twisted in the rotation direction, the four strain gauges 93 on the surface of the hollow portion 90 are deformed. Thus, detection signals indicating torque applied to the hollow portion 90 are transmitted to the main controller 15 from the strain gauges 93 through lead wires (not shown).

The main controller 15 receives detection signals from the torque sensor 9. The main controller 15 calculates torque applied to the output unit 8 based on the detection signals from the torque sensor 9. The main controller 15 stores a target torque. The main controller 15 controls the motor 5 to tighten the screw into the workpiece with the target torque in response to the detection signals from the torque sensor 9.

When determining that the torque applied to the output unit 8 reaches the target torque in response to the detection signals from the torque sensor 9, the main controller 15 controls the motor 5 to stop rotation of the rotor 52. The main controller 15 can thus control the motor 5 to tighten the screw into the workpiece with the target torque in response to the detection signals from the torque sensor 9.

The rear cover unit 100 includes the wireless communication device 1000. The main controller 15 transmits detection signals from the torque sensor 9 to the wireless communication device 1000. The wireless communication device 1000 transmits the detection signals from the torque sensor 9 to a management computer external to the screwing machine 1. The management computer records the detection signals from the torque sensor 9 in the screwing operation.

Operation of Indication Light Emitter

FIG. 25 is a table showing the relationship between the state of the screwing machine 1 in the embodiment and the light emission state of the indication light emitter 100A.

The interface controller 41 controls the light emission state of the indication light emitter 100A based on the state of the screwing machine 1. The indication light emitter 100A changes the light emission state based on the state of the screwing machine 1.

The indication light emitter 100A emits light from the light-emitting devices 47 including LEDs. The indication light emitter 100A includes two light-emitting devices 47. Changes in the light emission state of the indication light emitter 100A include at least one of changes in the color of emitted light, light emission duration, and whether the light blinks.

The state of the screwing machine 1 includes at least the operation state of the output unit 8. The operation state of the output unit 8 includes torque for tightening a screw applied to the output unit 8 in the screwing operation. The operation state of the output unit 8 includes a determination result indicating whether a screw is tightened into a workpiece with the target torque.

When the screwing is appropriate in FIG. 25, or when the difference between the target torque and the screwing torque on the output unit 8 in the screwing operation falls below a predetermined torque threshold, the interface controller 41 controls the light-emitting devices 47 to emit green light for two seconds.

When the screwing (torque) is inappropriate, or when the difference between the screwing torque on the output unit 8 in the screwing operation and the target torque exceeds the predetermined torque threshold, the interface controller 41 controls the two light-emitting devices 47 to emit red light for two seconds.

In the maintenance warning, or when the screwing machine 1 is determined to at least partially undergo maintenance, the interface controller 41 controls the two light-emitting devices 47 to blink with yellow light for more than two seconds.

Operation of Display

Figure 26:
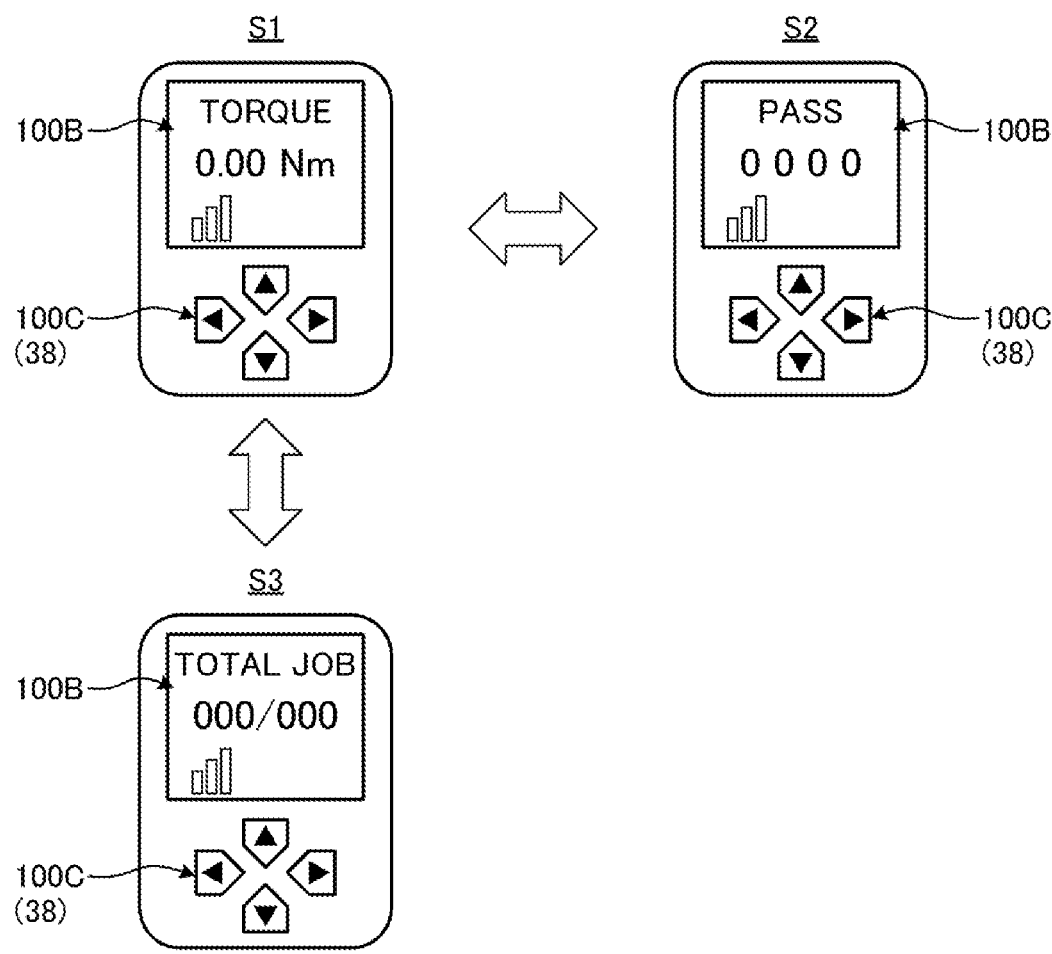
FIG. 26 is a diagram describing a screen transition for a display in the embodiment.

FIG. 26 is a diagram describing a screen transition for the display 100B in the embodiment.

The interface controller 41 controls display-data appearing on the display 100B based on the state of the screwing machine 1. The display 100B changes display-data based on the state of the screwing machine 1.

The state of the screwing machine 1 includes at least the setting state of the output unit 8. The setting state of the output unit 8 includes the state of setting the target torque when a screw is tightened into a workpiece in the screwing operation.

The interface controller 41 changes display-data appearing on the display 100B in response to the operation on the operation unit 100C.

As shown in FIG. 26, the display 100B displays a torque display screen S1, a password display screen S2, and an operation-count display screen S3.

A push on the button 382D with the torque display screen S1 being displayed changes the torque display screen S1 to the password display screen S2. A push on the button 382B with the password display screen S2 being displayed changes the password display screen S2 to the torque display screen S1.

A push on the button 382C with the torque display screen S1 being displayed changes the torque display screen S1 to the operation-count display screen S3. A push on the button 382A with the operation-count display screen S3 being displayed changes the operation-count display screen S3 to the torque display screen S1.

The torque display screen S1 displays a target torque for screwing a screw into a workpiece in the screwing operation. To change the target torque, a change command instructing a change of the target torque is transmitted from a personal computer external to the screwing machine 1 to the interface controller 41.

The operator inputs a password on the password display screen S2. For example, the operator inputs a password to change the setting of the output unit 8. The password in the embodiment includes a four-digit number. The number on the password display screen S2 increases with a push on the button 382A, and decreases with a push on the button 382C. The digit of the number on the password display screen S2 shifts leftward with a push on the button 382B, and shifts rightward with a push on the button 382D. To enter the changed number, the button 382 is depressed and held.

The operation-count display screen S3 displays the total number of screws tightened into the workpiece (the number of times a screwing operation is performed). The interface controller 41 counts the number of screws tightened into the workpiece. To check the number of screws tightened into the workpiece, the operator displays the operation-count display screen S3 on the display 100B.

As described above, the rear cover unit 100 in the embodiment includes the display panel 39 and the holder 40 that holds the display panel 39. The holder 40 is formed from metal or synthetic resin. More specifically, the holder 40 is formed from a material with high hardness and high strength. The holder 40 that holds the display panel 39 thus reduces deformation of the display panel 39. In an assembly operation of the rear cover unit 100 or a screwing operation with the screwing machine 1, for example, a force may be applied to the display panel 39. The holder 40 in the embodiment is formed from a material with high hardness and high strength. Thus, for example, the display screen 391 is less likely to warp upon receiving a force. The holder 40 is formed from an impact-resistant material. The display panel 39 is less likely to break under an impact applied to the rear cover unit 100. The holder 40 that holds the display panel 39 is formed from metal or synthetic resin, and thus reduces degradation of the display panel 39. Thus, the display screen 391 appropriately displays display-data.

The holder 40 is fastened to the cover 30. The holder 40 is fastened to the cover 30 to allow the display screen 391 in the display panel 39 to be received in the display opening 32 in the cover 30. Thus, the operator can view the display-data appearing on the display screen 391 through the display opening 32. The display cover 36 is located to cover the display opening 32. The display screen 391 is protected by the display cover 36 and is less likely to be degraded. The seal 37 seals the space between the display screen 391 and the display cover 36. The seal 37 reduces foreign matter around the rear cover unit 100 entering the space between the display screen 391 and the display cover 36. More specifically, the seal 37 reduces adhesion of foreign matter to the display screen 391 or the front surface of the display cover 36. Thus, the display screen 391 appropriately displays display-data. The operator can view the display-data appearing on the display screen 391. This structure reduces adhesion of foreign matter to the display screen 391 and thus reduces degradation of the display panel 39.

The seal 37 is in contact with the periphery of the display screen 391. This structure effectively reduces adhesion of foreign matter to the display screen 391. The seal 37 also functions as a buffer that reduces an impact on the display panel 39. The display panel 39 is less likely to deteriorate under an impact applied to the rear cover unit 100.

The cover 30 includes the positioners 304 that position the holder 40. The positioners 304 reduce changes of the relative positions between the cover 30 and the holder 40, between the cover 30 and the display panel 39, and between the display opening 32 and the display screen 391. Thus, the display screen 391 appropriately displays display-data, and the operator can view the display-data appearing on the display screen 391. In addition, this structure restricts movement of the display panel 39 and thus reduces degradation of the display panel 39. This structure also maintains the workability in mounting the holder 40 to the cover 30.

The holder 40 has the positioning openings 409. Each positioner 304 includes the positioning protrusion 310 received in the corresponding positioning opening 409. This structure effectively reduces changes of the relative positions between the cover 30 and the holder 40. This structure also maintains the workability in mounting the holder 40 to the cover 30.

The cover 30 covers the opening in a rear portion of the motor compartment 21. More specifically, the cover 30 functions as a rear cover covering the rear opening of the motor compartment 21 at the rear. The rear cover unit 100 is located in the rear portion of the motor compartment 21. The operator can thus smoothly exchange data with the rear cover unit 100.

The holder 40 includes the plate 402 facing the rear surface of the display panel 39 and the frame 401 surrounding the plate 402. The plate 402 at least partially has the connection opening 407. The connecting member 390 such as a flexible substrate or a lead wire that connects the display panel 39 to the first circuit board 45 extends through the connection opening 407. The display panel 39 and the first circuit board 45 are smoothly connected together with the connecting member 390 extending through the connection opening 407. With the connection opening 407, the connecting member 390 is less likely to receive excessive stress. This structure reduces degradation of the connecting member 390. Thus, the display screen 391 appropriately displays display-data.

The connection opening 407 is located at the periphery of the plate 402. The frame 401 has the recess 401A recessed away from the center of the connection opening 407. The connecting member 390 is at least partially positioned in the recess 401A. This structure maintains the workability in connecting the display panel 39 and the first circuit board 45 together with the connecting member 390.

The frame 401 includes the first portion 4011 protruding rearward from the periphery of the plate 402. The plate 402 and the first portion 4011 define the first space 4013. The display panel 39 is accommodated in the first space 4013. The rear end of the first portion 4011 in the embodiment protrudes rearward from the display screen 391. Thus, for example, to mount the holder 40 to the cover 30, the first portion 4011 is more likely to come into contact with the cover 30 earlier than with the display screen 391. This structure reduces degradation of the display screen 391. More specifically, the first portion 4011 protects the display screen 391. This structure maintains the workability in mounting the holder 40 to the cover 30.

The frame 401 includes the second portion 4012 protruding frontward from the periphery of the plate 402. The plate 402 and the second portion 4012 define the second space 4014. The connecting member 390 is at least partially accommodated in the second space 4014. The connecting member 390 is less likely to receive excessive stress. The first circuit board 45 is located in front of the second space 4014. Thus, the connecting member 390 accommodated in the second space 4014 is protected by the first circuit board 45. This structure reduces degradation of the connecting member 390. Thus, the display screen 391 appropriately displays display-data.

The rear cover unit 100 includes the second circuit board 46 facing the first circuit board 45 with the spacer 42 between them. The first circuit board 45 and the second circuit board 46 are stacked to avoid a size increase in the rear cover unit 100. The spacer 42 is located between the first circuit board 45 and the second circuit board 46. The spacer 42 prevents an electronic component mounted on the first circuit board 45 and an electronic component mounted on the second circuit board 46 from coming into contact with each other. This structure reduces degradation of the electronic components mounted on the first circuit board 45 and on the second circuit board 46. Thus, the display screen 391 of the display panel 39 appropriately displays display-data.

The first circuit board 45, the spacer 42, and the second circuit board 46 are fastened together with the first screws 43. This structure reduces changes in the relative positions between the first circuit board 45, the spacer 42, and the second circuit board 46.

The first circuit board 45 includes the positioners 453 that position the holder 40. The positioners 453 reduce changes in the relative positions between the first circuit board 45 and the holder 40.

The first circuit board 45 has the board openings 451. The spacer 42 includes the positioning protrusions 421 received in the board openings 451. Each positioner 453 includes the positioning protrusion 421. The holder 40 has the positioning openings 408 that receive the positioning protrusions 421. This structure effectively reduces changes in the relative positions between the spacer 42, the first circuit board 45, and the holder 40. When the first circuit board 45 includes no positioning protrusion, the positioning protrusions 421 in the spacer 42 effectively reduce changes in the relative positions between the spacer 42, the first circuit board 45, and the holder 40. This structure maintains the workability in positioning the spacer 42, the first circuit board 45, and the holder 40 relative to one another.

The holder 40 includes the hooks 404 that can be hooked at the periphery of the first circuit board 45. The hooks 404 couple the holder 40 to the first circuit board 45.

The interface controller 41 controls the display panel 39 based on the setting state of the output unit 8. Thus, the operator can check display-data appearing on the display panel 39, and check the setting state of the output unit 8.

Other Embodiments

The electric work machine in the above embodiment is a screwing machine (electric screwdriver), which is an example of a power tool. The power tool is not limited to an electric screwdriver, and may be, for example, a driver drill, an angle drill, an impact driver, a grinder, a hammer, a hammer drill, a circular saw, or a reciprocating saw. The electric work machine may be outdoor power equipment. The outdoor power equipment may be, for example, a chain saw, a hedge trimmer, a lawn mower, a mowing machine, or a blower.

In the above embodiments, the electric work machine is powered by the battery pack 16 attached to the battery mount. In some embodiments, the electric work machine may use utility power (alternating-current power supply).

REFERENCE SIGNS LIST 1 screwing machine
2 housing
2L left housing
2R right housing
2S screw
3 gear case
4 battery mount
5 motor
6 bearing box
7 planetary gear assembly
8 output unit
9 torque sensor
10 fan
11 trigger switch
11A trigger
11B switch body
12 forward-reverse switch lever
13 sound generator
14 light emitter
15 main controller
15A board
15B controller case
16 battery pack
21 motor compartment
22 grip
23 controller compartment
24A inlet
24B outlet
25 groove
30 cover
30A first partitioning space
30B second partitioning space
30C third partitioning space
30D fourth partitioning space
31 indication opening
32 display opening
33 operation opening
34 communication opening
35 optical diffuser
35A transmissive portion
35B connecting portion
36 display cover
37 seal
38 operation member
39 display panel
40 holder
41 interface controller
42 spacer
43 first screw
44 second screw
45 first circuit board
46 second circuit board
47 light-emitting device
48 switching element
48A switching element (first switching element)
48B switching element (second switching element)
48C switching element (third switching element)
48D switching element (fourth switching element)
49 optical member
50 light-emitting device
51 stator
51A stator core
51B front insulator
51C rear insulator
51D coil
51E sensor board
52 rotor
52A rotor core
52B permanent magnet
53 rotor shaft
53A front end
54 bearing
55 bearing
57 bearing holder
70 internal gear
71C carrier
71P planetary gear
71S pinion gear
72C carrier
72P planetary gear
72S sun gear
73 washer 74 elastic member
75 elastic member
81 spindle
81A insertion hole
82 chuck
82A ball
83 bearing
84 bearing
90 hollow portion
91 front plate
91G gear tooth
92 rear plate
93 strain gauge
96 through-hole
100 rear cover unit
100A indication light emitter
100B display
100C operation unit
100D communication light emitter
301 screw hole
302 screw hole
303 positioner
304 positioner
305 partitioning wall
306 partitioning wall
307 partitioning wall
308 groove
309 positioning protrusion
310 positioning protrusion
320 peripheral wall
330 protrusion
351B upper connecting portion
352B left connecting portion
353B right connecting portion
354B lower connecting portion
351 incident surface
352 emission surface
353 front surface
354 rear surface
355 recess
356 groove
381 plate
382 button
382A button (first button)
382B button (second button)
382C button (third button)
382D button (fourth button)
383 operation protrusion
383A operation protrusion (first operation protrusion)
383B operation protrusion (second operation protrusion)
383C operation protrusion (third operation protrusion)
383D operation protrusion (fourth operation protrusion)
384 positioner
385 interlocked-movement restrictor
386 slit
386A slit (first interlocked-movement restrictor)
386B slit (second interlocked-movement restrictor)
386C slit (third interlocked-movement restrictor)
386D slit (fourth interlocked-movement restrictor)
387 positioning opening
390 connecting member
391 display screen
401 frame
401A recess
402 plate
403 support plate
403L left support plate
403R right support plate
404 hook
404L left hook
404R right hook
405 positioner
406 positioner
407 connection opening
408 positioning opening
409 positioning opening
410 hook opening
421 positioning protrusion
422 annular portion
423 screw boss
424 screw opening
451 board opening
452 screw opening
453 positioner
454 screw recess
462 screw opening
500 cover
501 third circuit board
502 connector
700 lead wire
800 line filter
900 connector
1000 wireless communication device
1001 rib
3081 upper groove
3082 support surface
3083 support surface
3084 lower groove
4011 first portion
4012 second portion
4013 first space
4014 second space
AX rotation axis
CP center point
OX optical axis

What is claimed is:

1. An electric work machine, comprising:
a motor including a stator and a rotor, the rotor being rotatable relative to the stator;
an output unit configured to be driven by the rotor;
a display panel (1) configured to display a setting state of the output unit and (ii) having a rectangular outer periphery; and
a holder (i) directly holding the display panel, (ii) comprising a metal or synthetic resin, (iii) with an opening facing the display panel, and (iv) supported by and separate from a housing that houses the motor.

2. The electric work machine according to claim 1, further comprising:
a circuit board connected to the display panel;
wherein the holder includes a plate between the circuit board and the display panel.

3. The electric work machine according to claim 1, wherein the holder engages and retains the rectangular outer periphery of the display panel, but does not engage an inner portion of the display panel.

4. An electric work machine, comprising:
a motor including a stator and a rotor, the rotor being rotatable relative to the stator;
an output unit configured to be driven by the rotor;
a display panel configured to display a setting state of the output unit;
a holder holding the display panel;

a cover having a display opening receiving a display screen included in the display panel, the cover fastening the holder;

a display cover covering the display opening and facing the display screen; and a seal configured to seal a space between the display panel and the display cover.

5. The electric work machine according to claim 4, wherein the seal is in contact with a periphery of the display screen.

6. The electric work machine according to claim 5, wherein the cover includes a first positioner positioning the holder.

7. The electric work machine according to claim 4, wherein the cover includes a first positioner positioning the holder.

8. The electric work machine according to claim 7, wherein the holder has a first positioning opening, and the first positioner includes a first positioning protrusion in the first positioning opening.

9. The electric work machine according to claim 4, further comprising:

a motor compartment (i) housing the motor and (ii) having an opening at a rear of the motor compartment, wherein the cover covers the opening.

10. The electric work machine according to claim 4, wherein the holder includes a plate facing a rear surface of the display panel, the plate having a connection opening, and a frame surrounding the plate.

11. The electric work machine according to claim 10, wherein the connection opening is at a periphery of the plate, and the frame includes a recess recessed away from a center of the connection opening.

12. The electric work machine according to claim 10, wherein the frame includes a first portion protruding from the plate, and the display panel is in a first space defined by the plate and the first portion.

13. The electric work machine according to claim 12, wherein the frame includes a second portion protruding from the plate away from the first portion, and the plate and the second portion define a second space.

14. The electric work machine according to claim 4, further comprising:

a first circuit board supporting the holder;

a second circuit board facing the first circuit board; and a spacer between the first circuit board and the second circuit board.

15. The electric work machine according to claim 14, further comprising:

a first screw fastening the first circuit board, the spacer, and the second circuit board together.

16. The electric work machine according to claim 14, wherein the first circuit board includes a second positioner positioning the holder.

17. The electric work machine according to claim 16, wherein the first circuit board has a board opening, the spacer includes a second positioning protrusion received in the board opening, and the holder has a second positioning opening receiving the second positioning protrusion.

18. The electric work machine according to claim 14, wherein the holder includes a hook hooked on a periphery of the first circuit board.

19. The electric work machine according to claim 4, further comprising:

an interface controller configured to control the display panel based on the setting state of the output unit.

20. An electric work machine, comprising:

a motor including a stator and a rotor, the rotor being rotatable relative to the stator;

an output unit configured to be driven by the rotor;

a display panel configured to display a setting state of the output unit; and a holder holding the display panel, the holder including a plate facing a rear surface of the display panel, the plate having a connection opening, and a frame surrounding the plate.

* * * * *